(12) United States Patent
Imamura

(10) Patent No.: US 8,335,421 B2
(45) Date of Patent: Dec. 18, 2012

(54) OPTICAL TRANSMISSION SYSTEM AND MULTI-CORE OPTICAL FIBER

(75) Inventor: Katsunori Imamura, Tokyo (JP)

(73) Assignee: Furukawa Electric Co., Ltd., Tokyo (JP)

( * ) Notice: Subject to any disclaimer, the term of this patent is extended or adjusted under 35 U.S.C. 154(b) by 192 days.

(21) Appl. No.: 12/545,236

(22) Filed: Aug. 21, 2009

(65) Prior Publication Data

US 2009/0324242 A1  Dec. 31, 2009

Related U.S. Application Data

(63) Continuation of application No. PCT/JP2009/050374, filed on Jan. 14, 2009.

(30) Foreign Application Priority Data

Feb. 27, 2008  (JP) ................................ 2008-045980
Apr. 14, 2008  (JP) ................................ 2008-104693

(51) Int. Cl.
*G02B 6/032* (2006.01)
*G02B 6/036* (2006.01)
*H04B 10/12* (2006.01)

(52) U.S. Cl. ........................ 385/125; 385/126; 398/142

(58) Field of Classification Search .................. 385/125, 385/126; 398/142
See application file for complete search history.

(56) References Cited

U.S. PATENT DOCUMENTS

| 6,097,868 | A | 8/2000 | Tardy et al. | |
|---|---|---|---|---|
| 7,324,714 | B1 * | 1/2008 | Cranch et al. | 385/12 |
| 2004/0151454 | A1 * | 8/2004 | Fajardo et al. | 385/126 |
| 2004/0175084 | A1 * | 9/2004 | Broeng et al. | 385/125 |
| 2008/0138022 | A1 * | 6/2008 | Tassone | 385/124 |
| 2008/0219667 | A1 | 9/2008 | Imamura | |
| 2008/0273850 | A1 | 11/2008 | Imamura | |
| 2008/0310807 | A1 | 12/2008 | Imamura | |
| 2009/0080841 | A1 | 3/2009 | Imamura | |
| 2009/0080845 | A1 | 3/2009 | Imamura | |
| 2009/0097810 | A1 | 4/2009 | Imamura | |

(Continued)

FOREIGN PATENT DOCUMENTS

JP  11-095049  4/1999

(Continued)

OTHER PUBLICATIONS

Kazunori Mukasa et al., "Ultra wide-band transmission systems comprising a large Aeff Holey Fiber and a wide-band DCF," IEICE Technical Report, vol. 107, No. 444, pp. 53-56, OCS2007-95, Jan. 17, 2008.

(Continued)

*Primary Examiner* — Jerry Blevins
(74) *Attorney, Agent, or Firm* — Oblon, Spivak, McClelland, Maier & Neustadt, L.L.P.

(57) ABSTRACT

An optical transmission system includes an optical transmitting unit that outputs at least one optical signal having a wavelength included in an operation wavelength band and a holey fiber that is connected to the optical transmitting unit. The holey fiber includes a core and a cladding formed around the core. The cladding includes a plurality of holes formed around the core in a triangular lattice shape. The holey fiber transmits the optical signal in a single mode. A bending loss of the holey fiber is equal to or less than 5 dB/m at a wavelength within the operation wavelength band when the holey fiber is wound at a diameter of 20 millimeters.

15 Claims, 27 Drawing Sheets

U.S. PATENT DOCUMENTS

2009/0148112 A1    6/2009  Koyamada et al.

FOREIGN PATENT DOCUMENTS

| JP | 2003-255152 | 9/2003 |
|---|---|---|
| WO | WO 2006/100488 A1 | 9/2006 |
| WO | WO 2009/107414 A1 | 9/2009 |

OTHER PUBLICATIONS

Yukihiro Tsuchida et al., "Structural Dependence of Core-Shape on Bending Losses in Holey Fibers with Large Mode Area," Technical Report of IEICE OPE, vol. 105, No. 249, pp. 13-17, OPE2005-56, ISSN:09135685, Aug. 19, 2005.

Osamu Tohyama et al., "Photonic Crystal Fibers and Their Applications," Technical Report of IEICE OPE, vol. 102, No. 521, pp. 27-32, OPE2002-111, ISSN:09135685, Dec. 11, 2002.

Jian Zhou et al., "Low loss Photonic Crystal Fibers, "Technical Report of IEICE OFT, vol. 103, No. 257, pp. 41-46, OFT2003-26, ISSN:09135685, Aug. 14, 2003.

Koji Ieda et al., "Visible to infrared high-speed WDM transmission over PCF," IEICE Electronics Express, vol. 4, No. 12, pp. 375-379, Jun. 25, 2007.

Kenji Kurokawa et al., "Penalty-Free Dispersion-Managed Soliton Transmission Over a 100-km Low-Loss PCF," Journal of Lightwave Technology, vol. 24, No. 1, pp. 32-37, Jan. 2006.

K. Takima, "Low loss PCF by reduction of hole surface imperfection," ECOC 2007, 2 pgs., PDS 2.1, 2007.

Masanori Koshiba et al., "Applicability of classical optical fiber theories to holey fibers," Optic Letters, vol. 29, No. 15, pp. 1739-1741, Aug. 1, 2004.

U.S. Appl. No. 12/843,302, filed Jul. 26, 2010, Imamura.

U.S. Appl. No. 12/846,028, filed Jul. 29, 2010, Imamura.

U.S. Appl. No. 12/546,894, filed Aug. 25, 2009, Imamura.

Written Opinion of the International Searching Authority (Corrected Version), mailed Mar. 17, 2009, issued in PCT/JP2009/050374 filed Jan. 14, 2009 (with English Translation).

U.S. Appl. No. 13/238,902, filed Sep. 21, 2011, Imamura.

Yosuke Oikawa, et al., "40 Gbit/s (4x10 Gbit/s)-3 km WDM transmission using 850 nm VCSEL, AWG, and PCF", The Institute of Electronics, Information and Communication Engineers, vol. 106, No. 211, Aug. 2006, pp. 27-32 (with English Abstract).

U.S. Appl. No. 13/360,853, filed Jan. 30, 2012, Imamura.

M. Fujita, et al, "Photonic Crystal Fibers(1)—Optical Properties", pp. 1-9, (with a partial English translation).

Kiyoyuki Yokoyama, et al., "Numerical Analysis of Confinement Loss Including Bending Effects for Holey Fibers", The Information of Electronics, Information and Communication Engineers, NII-Electronic Library Service, 8 pages (with English abstract).

* cited by examiner

| Λ [μm] | MINIMUM WAVELENGTH [μm] | |
|---|---|---|
| | BENDING LOSS: 5 dB/m | BENDING LOSS: 1 dB/m |
| 4 | 0.378 | 0.418 |
| 5 | 0.527 | 0.574 |
| 6 | 0.694 | 0.754 |
| 7 | 0.881 | 0.969 |
| 8 | 1.097 | 1.204 |
| 9 | 1.293 | 1.417 |
| 10 | 1.453 | 1.645 |

| Λ [μm] | MAXIMUM WAVELENGTH [μm] | |
|---|---|---|
| | CONFINEMENT LOSS: 0.01 dB/km | CONFINEMENT LOSS: 0.001 dB/km |
| 2 | 0.652 | 0.470 |
| 3 | 1.017 | 0.741 |
| 4 | 1.397 | 1.047 |
| 5 | >1.7 | 1.327 |
| 6 | >1.7 | 1.625 |
| 7 | >1.7 | >1.7 |
| 8 | >1.7 | >1.7 |
| 9 | >1.7 | >1.7 |
| 10 | >1.7 | >1.7 |

| NUMBER OF HOLE LAYERS | Λ [μm] | MINIMUM WAVELENGTH [μm] (BENDING LOSS: 1 dB/m) |
|---|---|---|
| 4 | 5 | 0.595 |
| 4 | 7 | 0.995 |
| 4 | 9 | 1.465 |
| 5 | 5 | 0.574 |
| 5 | 7 | 0.969 |
| 5 | 9 | 1.417 |
| 6 | 5 | 0.567 |
| 6 | 7 | 0.943 |
| 6 | 9 | 1.388 |

| NUMBER OF HOLE LAYERS | Λ [μm] | MAXIMUM WAVELENGTH [μm] (CONFINEMENT LOSS: 0.001 dB/km) |
|---|---|---|
| 4 | 7 | 0.439 |
| 4 | 9 | 0.626 |
| 4 | 11 | 0.828 |
| 5 | 2 | 0.47 |
| 5 | 4 | 1.047 |
| 5 | 6 | 1.625 |
| 6 | 1 | 0.403 |
| 6 | 2 | 0.835 |
| 6 | 3 | 1.284 |

| d/Λ | Λ [μm] | MINIMUM WAVELENGTH [μm] (BENDING LOSS: 1 dB/m) | Aeff [μm²] (@1.55 μm) |
|---|---|---|---|
| 0.40 | 5 | 0.667 | 37.8 |
| 0.40 | 7 | 1.117 | 70.5 |
| 0.40 | 9 | 1.648 | 113.5 |
| 0.43 | 5 | 0.574 | 35.5 |
| 0.43 | 7 | 0.969 | 66.2 |
| 0.43 | 9 | 1.417 | 106.8 |
| 0.48 | 5 | 0.449 | 31.3 |
| 0.48 | 7 | 0.743 | 60.1 |
| 0.48 | 9 | 1.088 | 97.2 |
| 0.50 | 5 | 0.415 | 30.9 |
| 0.50 | 7 | 0.685 | 57.9 |
| 0.50 | 9 | 1.002 | 93.6 |

| d/Λ | Λ [μm] | MAXIMUM WAVELENGTH [μm] (CONFINEMENT LOSS: 0.001 dB/km) | Aeff [μm²] (@1.55 μm) |
|---|---|---|---|
| 0.40 | 5 | 0.845 | 37.8 |
| 0.40 | 7 | 1.263 | 70.5 |
| 0.40 | 9 | 1.691 | 113.5 |
| 0.43 | 4 | 1.047 | 23.8 |
| 0.43 | 5 | 1.327 | 35.5 |
| 0.43 | 6 | 1.625 | 49.6 |
| 0.48 | 2 | 0.792 | 5.2 |
| 0.48 | 3 | 1.223 | 12.0 |
| 0.48 | 4 | 1.661 | 21.4 |

| WAVELENGTH | CONFINEMENT LOSS | WAVELENGTH DISPERSION | Aeff | BENDING LOSS |
|---|---|---|---|---|
| $\mu$m | dB/km | ps/nm/km | $\mu m^2$ | dB/m |
| 0.55 | $1.3 \times 10^{-5}$ | −383.5 | 31.9 | 2.4 |
| 0.85 | $7.9 \times 10^{-5}$ | −72.2 | 32.9 | $4.0 \times 10^{-5}$ |
| 1.05 | $2.4 \times 10^{-4}$ | −15.9 | 33.6 | $7.3 \times 10^{-6}$ |
| 1.55 | $3.1 \times 10^{-3}$ | 40.0 | 35.5 | $9.9 \times 10^{-6}$ |

|  | CONFINEMENT LOSS | WAVELENGTH DISPERSION | Aeff | BENDING LOSS |
|---|---|---|---|---|
|  | dB/km | ps/nm/km | $\mu m^2$ | dB/m |
| SINGLE-CORE | $3.1 \times 10^{-3}$ | 40.0 | 35.5 | $9.9 \times 10^{-6}$ |
| MULTI-CORE 511 | $2.2 \times 10^{-7}$ | 40.0 | 35.5 | $3.3 \times 10^{-13}$ |
| MULTI-CORE 513 | $1.9 \times 10^{-3}$ | 40.0 | 35.5 | $2.0 \times 10^{-7}$ |

FIG.34
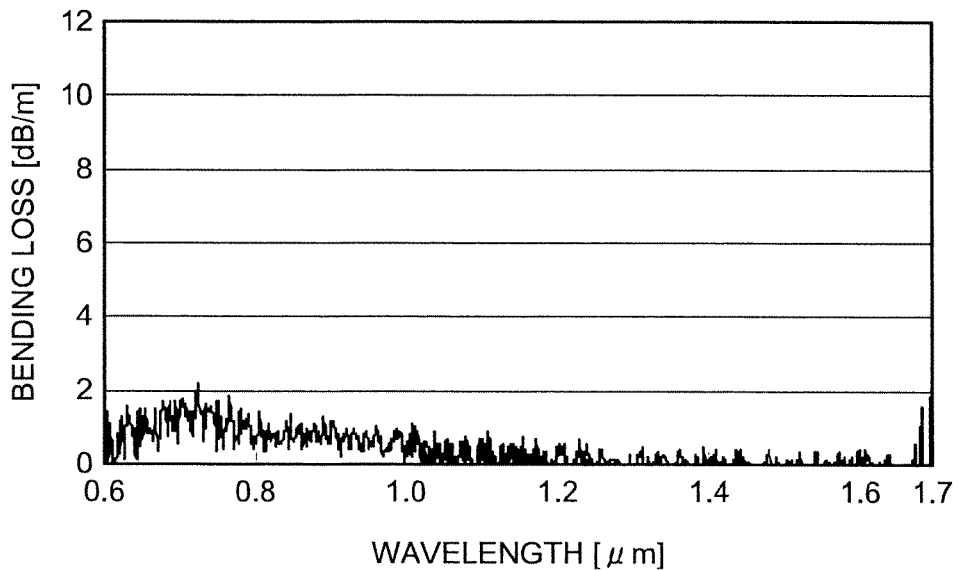
FIG.35
| WAVELENGTH | 0.85 μm | | 1.55 μm |
|---|---|---|---|
| BENDING CONDITIONS | WITHOUT BENDING | WITH BENDING | WITHOUT BENDING |
| X-Y | −17 dB | −19 dB | −33 dB |
| X-Z | −24 dB | −26 dB | −33 dB |
FIG.36
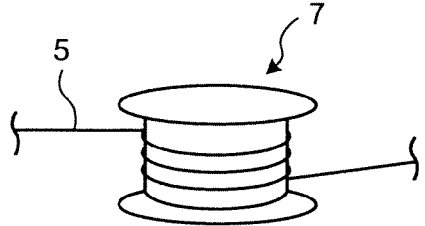
FIG.37
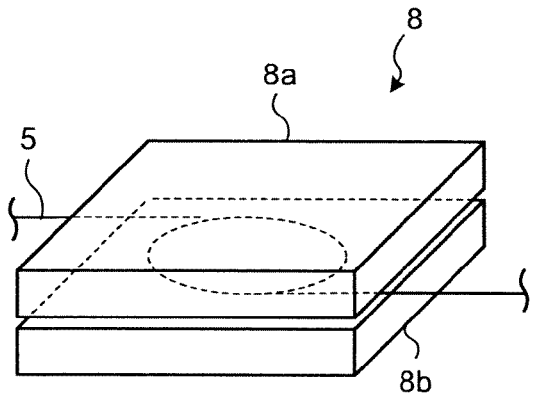

OPTICAL TRANSMISSION SYSTEM AND MULTI-CORE OPTICAL FIBER

CROSS-REFERENCE TO RELATED APPLICATIONS

This application is a continuation of PCT/JP2009/050374 filed on Jan. 14, 2009, the entire content of which are incorporated herein by reference.

BACKGROUND OF THE INVENTION

1. Field of the Invention

The present invention relates to an optical transmission system and a multi-core optical fiber that can be used in the optical transmission system.

2. Description of the Related Art

In optical communications, the transmission capacity has increased rapidly with developments of an optical amplifier, a signal modulation/demodulation scheme, and the like. In addition, a demand for data has been also increasing for sure along with a spread of the fiber to the home (FTTH). Therefore, a further increase of the transmission capacity is indispensable. A method of increasing a transmission capacity is disclosed in which a holey fiber (hereinafter, referred to as "HF" as appropriate), which is a new type of optical fiber, is used as an optical transmission line. The holey fiber has a hole structure, and confines a light in the core region by holes. For example, in K. Ieda, K. Kurokawa, K. Tajima, and K. Nakajima, "Visible to infrared high-speed WDM transmission over PCF", IEICE Electron. Express, vol. 4, no. 12, pp. 375-379 (2007), an optical transmission line with a length of 1 kilometer is deployed using a photonic-crystal fiber (PCF), which is a kind of the holey fiber, to realize an optical transmission across a broad bandwidth including wavelengths of 658 nanometers to 1556 nanometers. As for the holey fiber, some improvements have been made in terms of the length of the fiber used and the transmission loss (see, for example, K. Kurokawa, K. Tajima, K. Tsujikawa, K. Nakajima, T. Matsui, I. Sankawa, and T. Haibara, "Penalty-free dispersion-managed soliton transmission over a 100-km low-loss PCF", J. Lightwave Technol., vol. 24, no. 1, pp. 32-37 (2006) and K. Tajima, "Low loss PCF by reduction of hole surface imperfection", ECOC 2007, PD 2.1 (2007)). For example, K. Tajima, "Low loss PCF by reduction of hole surface imperfection", ECOC 2007, PD 2.1 (2007) discloses a holey fiber that can reduce a transmission loss as low as about 0.18 dB/km at a wavelength of 1.55 micrometers. As just described, the broadband optical transmission using a holey fiber is a technology having a sufficient potential to be practically used in the future.

Characteristics of a holey fiber are mainly determined by a ratio $d/\Lambda$, which is a ratio of a diameter d of a hole to a distance $\Lambda$ between adjacent holes. M. Koshiba and K. Saitoh, "Applicability of classical optical fiber theories to holey fibers", Opt. Lett., vol. 29, no. 15, pp. 1739-1741 (2004) discloses that a holey fiber having holes arranged in a form of triangular lattice can realize a single-mode transmission at all wavelengths by setting $d/\Lambda$ equal to or less than 0.43. The characteristic of being able to realize the single-mode transmission at all wavelengths is called the Endlessly Single-Mode (ESM) characteristic. If the single-mode transmission is realized in this manner, a faster optical transmission can be achieved. At the same time, a coupling of a light with a higher-order mode of the holey fiber can be prevented when the light is input into the holey fiber connected to another optical fiber and alike, thus preventing an increase of a connection loss.

As a type of the holey fiber, a multi-core holey fiber having a plurality of cores arranged separately from each other is disclosed (see International Publication No. WO 2006/100488 Pamphlet). Because the multi-core holey fiber can transmit a different optical signal through each of the cores, for example, it is considered to enable an ultra-high capacity transmission by way of a space division multiplexing (SDM) transmission.

However, with the conventional holey fiber, both an ordinary holey fiber having a single core and a multi-core holey fiber having a plurality of cores have a problem that a bending loss sharply increases particularly at the short-wavelength side as an operation wavelength band increases.

For example, the holey fiber disclosed in K. Ieda, K. Kurokawa, K. Tajima, and K. Nakajima, "Visible to infrared high-speed WDM transmission over PCF," IEICE Electron. Express, vol. 4, no. 12, pp. 375-379 (2007) shows that a bending loss occurred when the fiber is wound ten times in a radius of 15 millimeters is 0.1 dB at a wavelength of 658 nanometers. However, when the inventors of the present invention experimented using a finite element method (FEM) simulation with the parameters ($\Lambda=7.5$ micrometers, $d/\Lambda=0.5$) disclosed in K. Ieda, K. Kurokawa, K. Tajima, and K. Nakajima, "Visible to infrared high-speed WDM transmission over PCF," IEICE Electron. Express, vol. 4, no. 12, pp. 375-379 (2007), the bending loss of the fiber wound at a diameter of 20 millimeters is as high as 10 dB/m at the wavelength of 658 nanometers, which is considerably high. In addition, if $d/\Lambda$ is reduced to achieve the ESM characteristic, the bending loss is considered to increase because an effective refractive index difference between the core and the cladding is also reduced.

SUMMARY OF THE INVENTION

It is an object of the present invention to at least partially solve the problems in the conventional technology.

According to one aspect of the present invention, there is provided an optical transmission system including an optical transmitting unit that outputs at least one optical signal having a wavelength included in an operation wavelength band and a holey fiber that is connected to the optical transmitting unit. The holey fiber includes a core through which the optical signal is transmitted and a cladding formed around the core. The cladding includes a plurality of holes formed around the core in a triangular lattice shape. The holey fiber transmits the optical signal in a single mode. A bending loss of the holey fiber is equal to or less than 5 dB/m at a wavelength in the operation wavelength band when the holey fiber is wound at a diameter of 20 millimeters.

Furthermore, according to another aspect of the present invention, there is provided an optical transmission system including an optical transmitting unit that outputs at least one optical signal having a wavelength included in an operation wavelength band; a holey fiber that is connected to the optical transmitting unit and that includes a plurality of cores separated from each other through each of which the optical signal is transmitted, and a cladding formed around the cores, the cladding including a plurality of holes arranged around each of the cores in a triangular lattice shape; an optical multiplexing unit that multiplexes optical signals output from the optical transmitting unit; an optical demultiplexing unit that demultiplexes the optical signals transmitted through the holey fiber; and an optical receiving unit that receives the optical signals demultiplexed by the optical demultiplexing unit. The holey fiber transmits the optical signal in a single mode through each of the cores. A bending loss of the holey fiber is equal to or less than 5 dB/m at a wavelength in the operation wavelength band when the holey fiber is wound at a diameter of 20 millimeters.

Moreover, according to still another aspect of the present invention, there is provided a multi-core optical fiber including a plurality of cores through each of which an optical signal is transmitted and a cladding formed around the cores. At least one of the cores is arranged at a position offset from a standard arrangement position where each of the cores is arranged in a rotational symmetry around a center axis of the cladding.

Furthermore, according to still another aspect of the present invention, there is provided a multi-core optical fiber including a plurality of cores through each of which an optical signal is transmitted and a cladding formed around the cores. The cores are arranged at standard arrangement position where each of the cores is arranged in a rotational symmetry around a center axis of the cladding. At least one of the standard arrangement positions is excluded from an arrangement of a core.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 34 is a schematic of wavelength dependency of a bending loss when the light was propagated through the core of the manufactured multi-core HF;

FIG. 35 is a schematic of crosstalk measurement results in the manufactured multi-core HF;

FIG. 36 is a schematic of an exemplary bend applying unit included in the optical transmission system according to the second embodiment;

FIG. 37 is a schematic of an exemplary lateral pressure applying unit included in the optical transmission system according to the second embodiment;

DETAILED DESCRIPTION OF THE PREFERRED EMBODIMENTS

Exemplary embodiments of an optical transmission system and a multi-core optical fiber according to the present invention will be explained in detail below with reference to the accompanying drawings. It should be understood that these embodiments are not intended to limit the scope of the present invention. A bending loss is defined as a loss accrued when an optical fiber is wound at a diameter of 20 millimeters. The terms not especially defined herein shall follow the definitions and the measurement methods defined in the International Telecommunication Union Telecommunication Standardization Sector (ITU-T) G.650.1.

Figure 1:
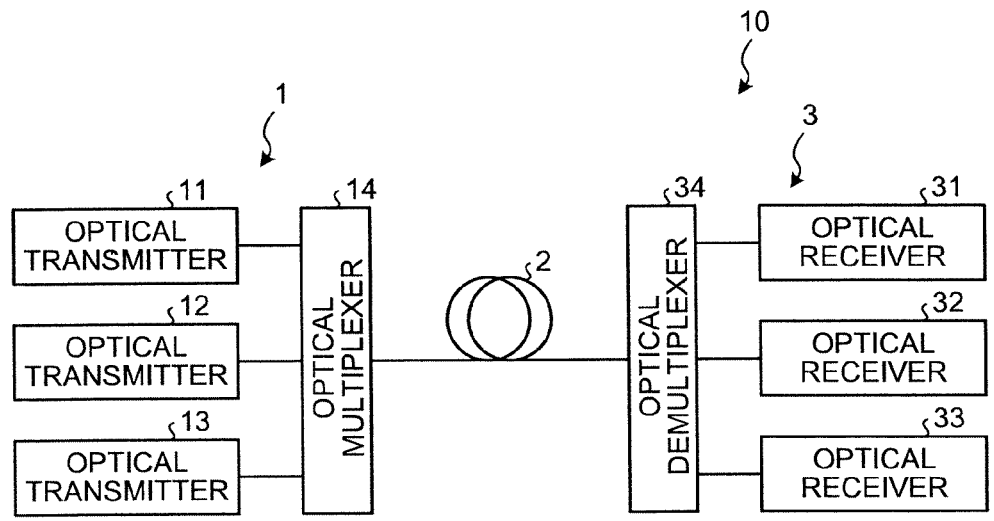
FIG. 1 is a block diagram of an optical transmission system according to a first embodiment of the present invention.

FIG. 1 is a block diagram of an optical transmission system 10 according to a first embodiment of the present invention. As shown in FIG. 1, the optical transmission system 10 according to the first embodiment includes an optical transmitting apparatus 1, an HF 2 connected to the optical transmitting apparatus 1, and an optical receiving apparatus 3 connected to the HF 2. The optical transmitting apparatus 1 further includes optical transmitters 11 to 13, each outputting an optical signal having a different wavelength from each other, and an optical multiplexer 14 that multiplexes each of the signals output from the optical transmitters 11 to 13 and outputs the multiplexed signal to the HF 2. The optical receiving apparatus 3 includes an optical demultiplexer 34 that demultiplexes the optical signal multiplexed and transmitted over the HF 2 to each of the optical signals, and optical receivers 31 to 33 respectively receiving each of the demultiplexed signals.

The optical signals output from the optical transmitters 11 to 13 are, for example, laser beams modulated with a non-return-to-zero (NRZ) signal whose modulation speed is 10 Gbps. Wavelengths of these optical signals are 0.55 micrometers, 1.05 micrometers, and 1.55 micrometers, respectively. These wavelengths are distributed in a broad wavelength bandwidth having a center thereof at approximately 1 micrometer. The HF 2 transmits each of the optical signals in a single mode. A bending loss characteristic of the HF 2 is equal to or less than 5 dB/m at the wavelength of each of these optical signals included in an operation wavelength band. Therefore, the HF 2 can transmit each of the optical signals in the single mode with a bending loss that is practically low enough. The optical receivers 31 to 33 receive each of the optical signals transmitted over the HF 2 and demultiplexed by the optical demultiplexer 34. The optical receivers 31 to 33 extract the NRZ signal from each of the optical signals as an electrical signal. In this manner, the optical transmission system 10 can transmit optical signals in the single mode in a broad bandwidth with a low bending loss.

Figure 2:
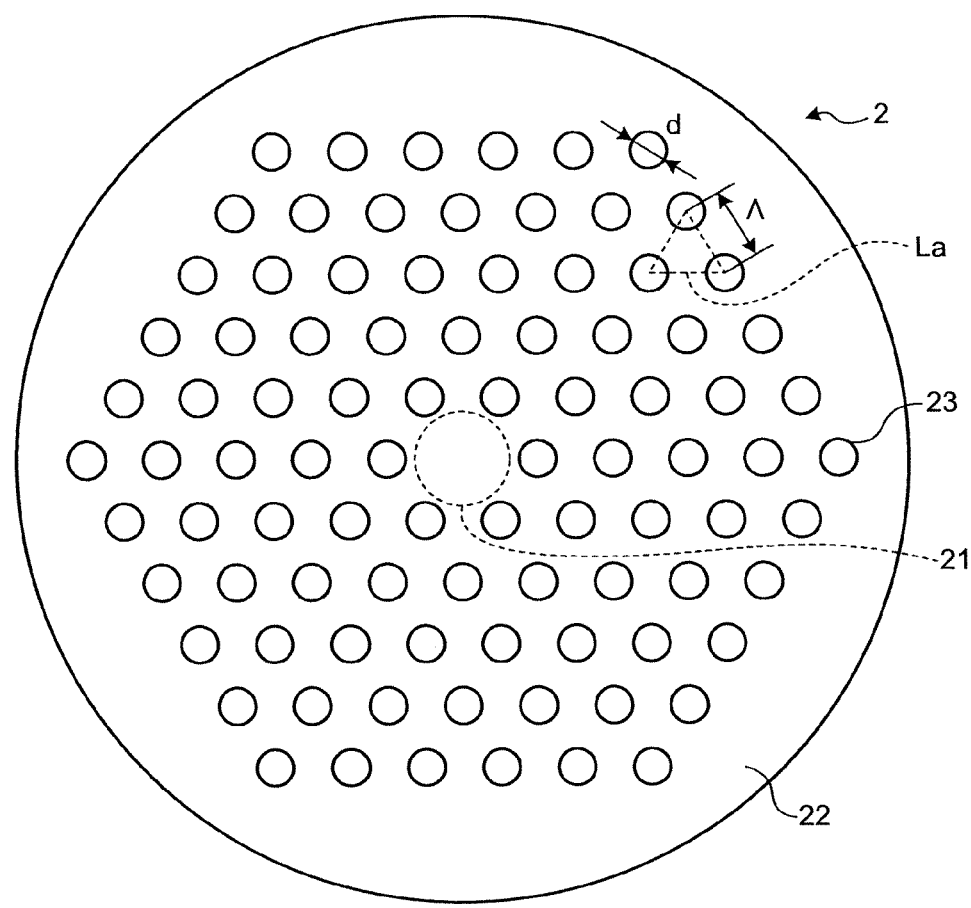
FIG. 2 is a schematic sectional view of an HF shown in FIG. 1.

A specific structure of the HF 2 will now be explained. FIG. 2 is a schematic sectional view of the HF 2 shown in FIG. 1. As shown in FIG. 2, the HF 2 includes a core 21 arranged at the center thereof, and a cladding 22 arranged on the external circumference of the core 21. The cladding 22 has a plurality of holes 23 periodically arranged around the core 21. The core 21 and the cladding 22 are made of silica based glass. The holes 23 are arranged in a form of a triangular lattice La, in layers of a regular hexagon surrounding the core 21. In the HF 2, the number of these hole layers is five.

When a diameter of the hole 23 is denoted as d [μm], and a lattice constant of a triangular lattice La is denoted as Λ [μm], d/Λ is 0.43. Therefore, the HF 2 achieves the ESM characteristics across the entire operation wavelength band that is between 0.55 micrometers and 1.55 micrometers. Furthermore, in the HF 2, when the minimum wavelength in the operation wavelength band, that is 0.55 micrometers, is denoted as $\lambda_s$ [μm], Λ is set to 5 micrometers correspondingly to $\lambda_s$ so that $\Lambda \leq -0.518\lambda_s^2 + 6.3617\lambda_s + 1.7468$ is established. As a result, in the HF 2, the bending loss becomes equal to or less than 5 dB/m that is a bending loss practically low enough, at the wavelengths of each of the optical signal included in the operation wavelength band.

Figures 3, 4:
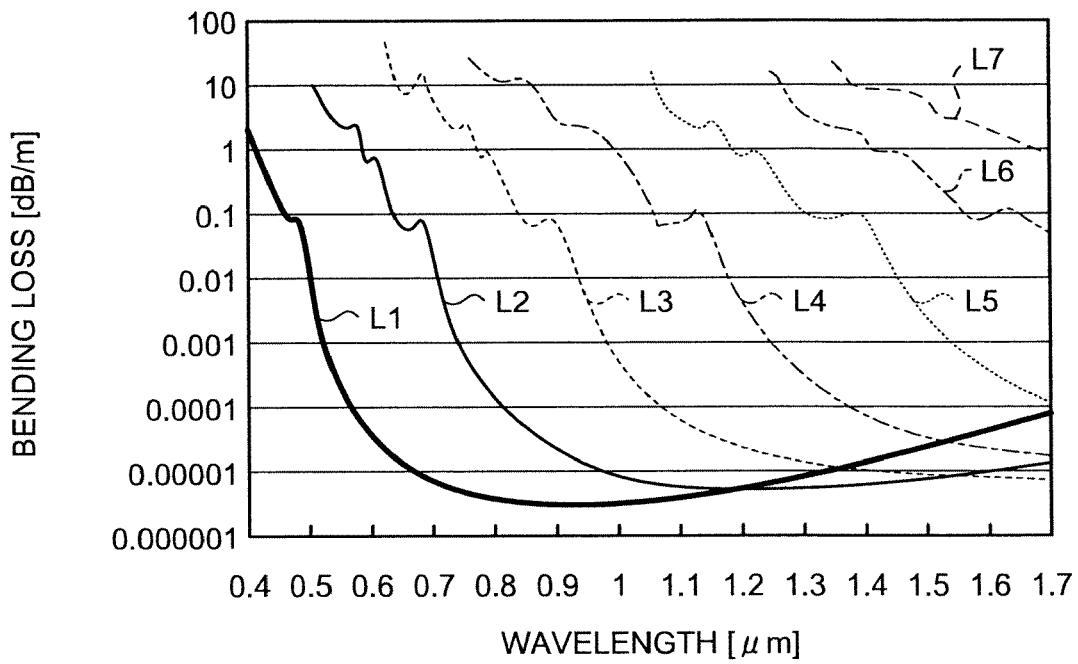
FIG. 3 is a schematic of wavelength dependency of a bending loss calculated using FEM simulation by changing $\Lambda$ from 4 micrometers to 10 micrometers while fixing d/$\Lambda$ to 0.43 in the HF having the structure shown in FIG. 2.
FIG. 4 is a schematic of a relationship between $\Lambda$ and the minimum wavelength where the bending loss becomes 5 dB/m, or 1 dB/m that is a more preferable value, in FIG. 3.
Figure 5:
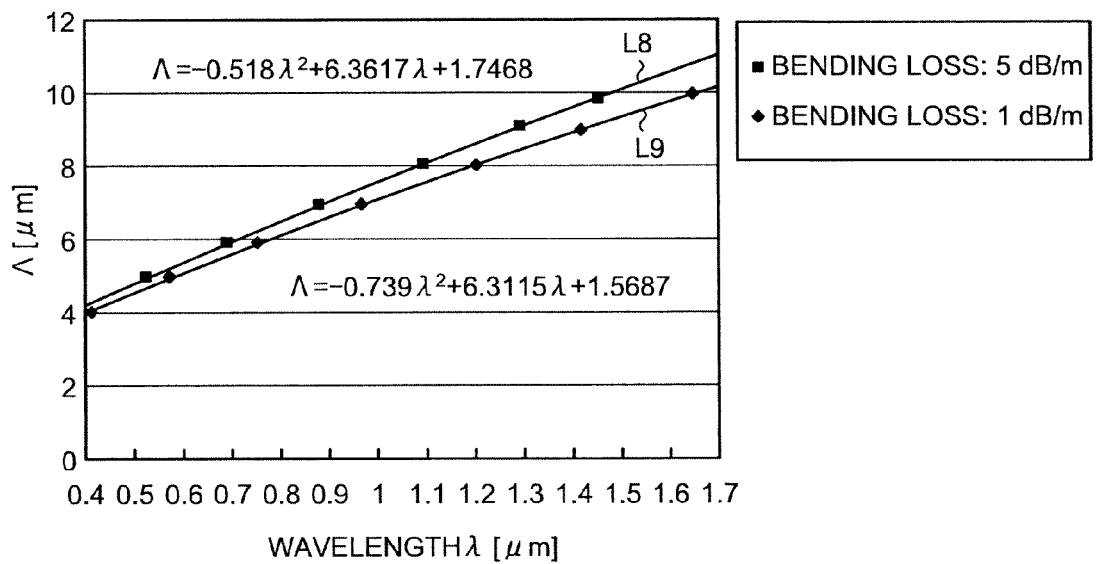
FIG. 5 is a graph plotting a relationship between the minimum wavelength and $\Lambda$ shown in FIG. 4.

A specific explanation will be provided below. FIG. 3 is a schematic of wavelength dependency of the bending loss in the HF having the structure shown in FIG. 2. In this diagram, the wavelength dependency is calculated using the FEM simulation by changing Λ from 4 micrometers to 10 micrometers while fixing d/Λ to 0.43. Lines L1 to L7 are curves representing the wavelength dependency of the bending loss when Λ is 4 micrometers, 5 micrometers, 6 micrometers, 7 micrometers, 8 micrometers, 9 micrometers, and 10 micrometers, respectively. As shown in FIG. 3, all of the lines L1 to L7 indicate that the bending loss rises toward shorter end of the wavelengths. At the same time, when Λ becomes smaller, the wavelength, where the bending loss increases, is shifted toward the shorter end of the wavelengths. FIG. 4 is a schematic of a relationship between Λ and the minimum wavelength where the bending loss becomes 5 dB/m, or 1 dB/m that is a more preferable value, in FIG. 3. In other words, such a bending loss, which is equal to or less than 5 dB/m or 1 dB/m, can be achieved at wavelengths longer than those shown in FIG. 4 for each of the values of Λ. FIG. 5 is a graph plotting the relationship between the minimum wavelength and Λ shown in FIG. 4. Lines L8 and L9 are curves respectively representing such a relationship when the bending loss is 5 dB/m or 1 dB/m. Each of these lines is expressed by formulas $\Lambda = -0.518\lambda_s^2 + 6.3617\lambda_s + 1.7468$, and $\Lambda = -0.739\lambda_s^2 + 6.3115\lambda + 1.5687$.

The line L8 shown in FIG. 5 specifies the minimum wavelength where the bending loss becomes equal to or less than 5 dB/m. Therefore, in the manner according to the first embodiment, if Λ is set for the HF 2 correspondingly to $\lambda_s$ that is the minimum wavelength within the operation wavelength band so that $\Lambda \leq -0.518\lambda_s^2 + 6.3617\lambda_s + 1.7468$ is established, it is possible to make the bending loss equal to or less than 5 dB/m at the wavelength of each of the optical signals.

Figure 6:
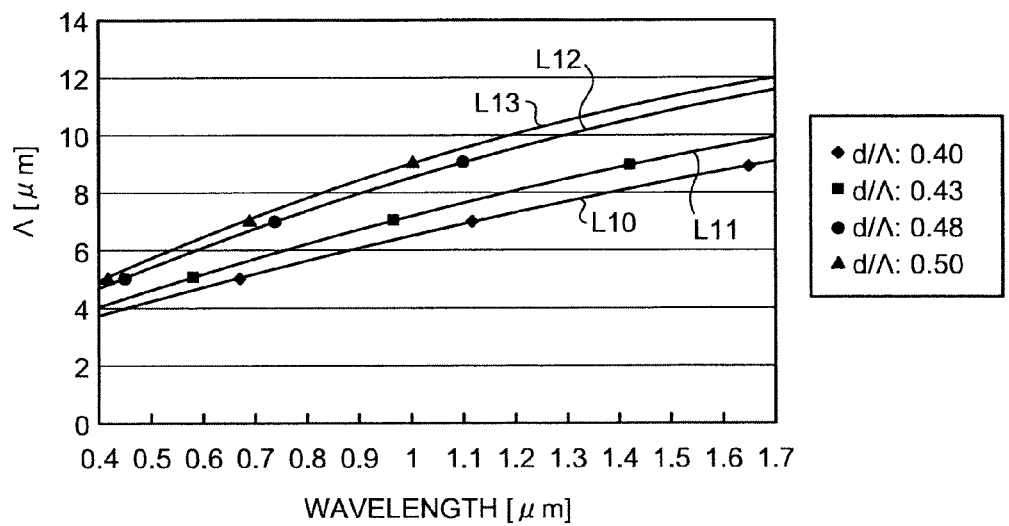
FIG. 6 is a schematic of a relationship between $\Lambda$ and the minimum wavelength where the bending loss becomes 1 dB/m when d/$\Lambda$ is 0.40, 0.43, 0.48, and 0.50, respectively, in an HF having the same structure as one shown in FIG. 2.

In the HF 2 according to the first embodiment, d/Λ is 0.43; however, the present invention is not limited to this value, and the ESM characteristic can be realized with a value less than 0.43. FIG. 6 is a schematic of a relationship between Λ and the minimum wavelength where the bending loss becomes 1 dB/m when d/Λ is 0.40, 0.43, 0.48, and 0.50 in an HF having the same structure as one shown in FIG. 2. Lines L10 to L13 are curves representing the relationship when d/Λ is 0.40, 0.43, 0.48, and 0.50, respectively. As shown in FIG. 6, when d/Λ becomes smaller, the minimum wavelength, realizing a bending loss equal to or less than 1 dB/m for the given Λ, becomes longer. Therefore, d/Λ is set accordingly to a desired operation wavelength band.

A confinement loss in the HF 2 according to the first embodiment will now be explained. An HF generally has a characteristic called a confinement loss. This is a loss that occurs due to the light leaking from the hole structure. As described above, because the transmission loss has become reduced approximately to 0.18 dB/km in a conventional HF at the wavelength of 1550 nanometers, it is preferable to make the confinement loss equal to or less than 0.01 dB/km or 0.001 dB/km that is sufficiently low in comparison with the transmission loss.

Because Λ is set to 5 micrometers in the HF 2 according to the first embodiment, when 1.55 micrometers, the maximum wavelength in the operation wavelength band, is denoted as $\lambda_l$ [μm], $\Lambda \leq -0.1452\lambda_l^2 + 2.982\lambda_l + 0.1174$ is established. Therefore, the HF 2 achieves a confinement loss equal to or less than 0.01 dB/km, that is sufficiently low, in each of the wavelength of the optical signals.

Figures 7, 8:
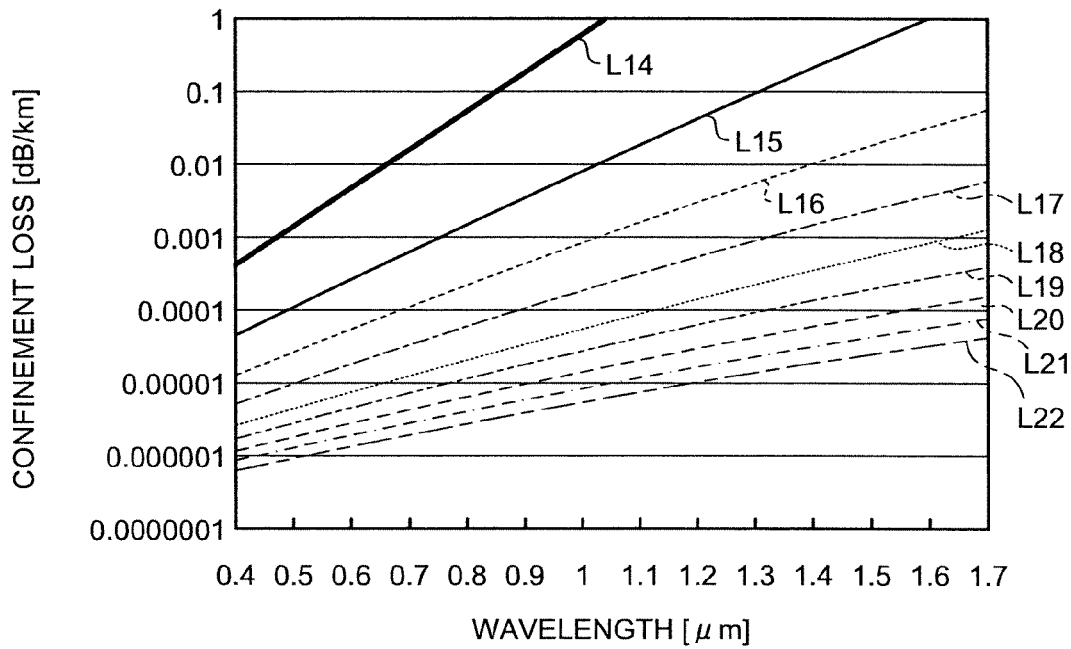
FIG. 7 is a schematic of wavelength dependency of a confinement loss calculated using the FEM simulation by changing $\Lambda$ from 2 micrometers to 10 micrometers while fixing d/$\Lambda$ to 0.43 in the HF having the structure shown in FIG. 2.
FIG. 8 is a schematic of relationship between $\Lambda$ and the maximum wavelength where the confinement loss becomes 0.01 dB/km, or 0.001 dB/km that is a more preferable value, in FIG. 7.
Figure 9:
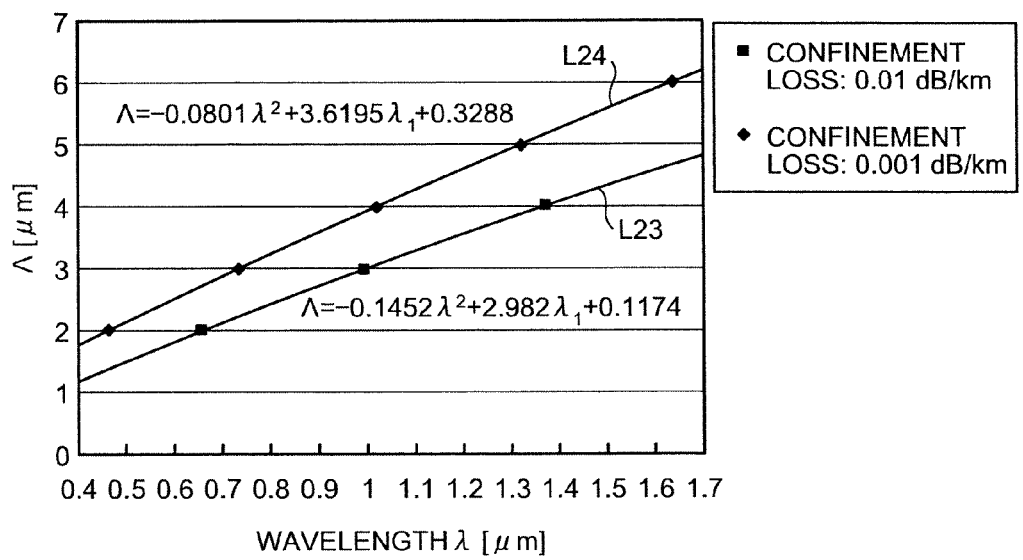
FIG. 9 is a graph plotting the relationship between the maximum wavelength and $\Lambda$, shown in FIG. 8.

A specific explanation will now be provided. FIG. 7 is a schematic of wavelength dependency of the confinement loss. In this diagram, the wavelength dependency is calculated using the FEM simulation by changing Λ from 2 micrometers to 10 micrometers while fixing d/Λ to 0.43. Lines L14 to L22 are curves representing the wavelength dependency of the confinement loss when Λ is 2 micrometers, 3 micrometers, 4 micrometers, 5 micrometers, 6 micrometers, 7 micrometers, 8 micrometers, 9 micrometers, and 10 micrometers, respectively. As shown in FIG. 7, all of the lines L14 to L22 indicate that the confinement loss rises toward the longer end of the wavelengths. At the same time, the greater Λ is, the smaller the confinement loss becomes toward the longer end of the wavelengths. FIG. 8 is a schematic of the relationship between Λ and the maximum wavelength where the confinement loss becomes 0.01 dB/km, or 0.001 dB/km that is a more preferable value, in FIG. 7. In other words, it is possible to achieve a confinement loss equal to or less than 0.01 dB/km or 0.001 dB/km at a wavelength shorter than that shown in FIG. 8 for each of the values of Λ. FIG. 9 is a graph plotting the relationship between the maximum wavelength and Λ shown in FIG. 8. Lines L23 and L24 are curves representing the relationships when the confinement loss is 0.01 dB/km and 0.001 dB/km, respectively, and each of these lines is expressed by a formula, $\Lambda = -0.1452\lambda_l^2 + 2.982\lambda_l + 0.1174$, and $\Lambda = -0.0801\lambda_l^2 + 3.6195\lambda_l + 0.3288$, respectively.

The line L23 shown in FIG. 9 indicates the maximum wavelength where the confinement loss becomes equal to or less than 0.01 dB/km. In the HF 2 according to the first embodiment, because $\Lambda \geq -0.1452\lambda_l^2 + 2.982\lambda_l + 0.1174$ is established for $\lambda_l$ that is the maximum wavelength within the operation wavelength band, the confinement loss becomes equal to or less than 0.01 dB/km at each of the wavelengths of the optical signals.

Figure 10:
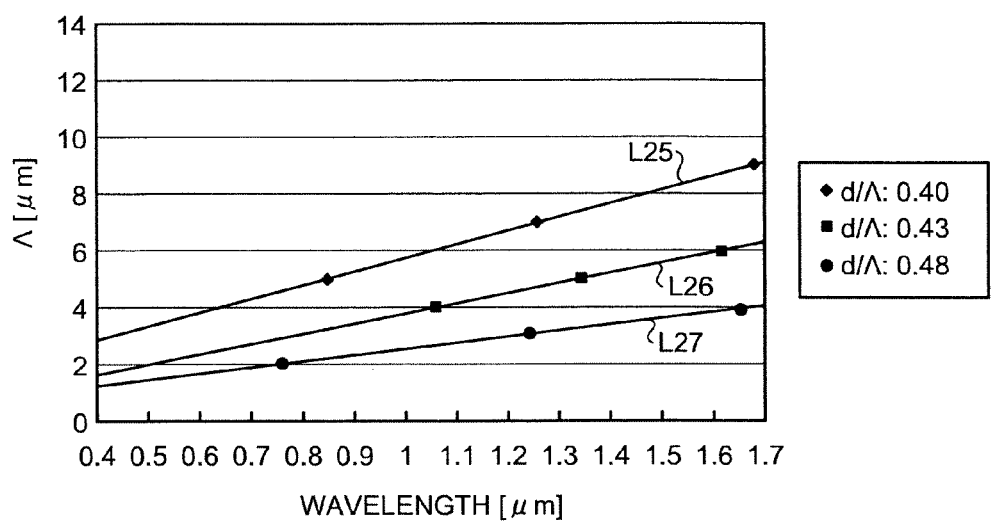
FIG. 10 is a schematic of a relationship between $\Lambda$ and the maximum wavelength where the confinement loss becomes 0.001 dB/km when d/$\Lambda$ is 0.40, 0.43, and 0.48, respectively, in an HF having the same structure as one shown in FIG. 2.

FIG. 10 is a schematic of a relationship between Λ and the maximum wavelength where the confinement loss becomes 0.001 dB/km, when d/Λ is 0.40, 0.43, and 0.48, respectively, in an HF having the same structure as one shown in FIG. 2. Lines L25 to L27 are curves representing the relationship when d/Λ is 0.40, 0.43, and 0.48, respectively. As shown in FIG. 10, when d/Λ becomes smaller, the maximum wavelength, realizing a confinement loss equal to or less than 0.001 dB/km for the given Λ, becomes shorter. Therefore, d/Λ is set accordingly to a desired operation wavelength band.

Figure 11:
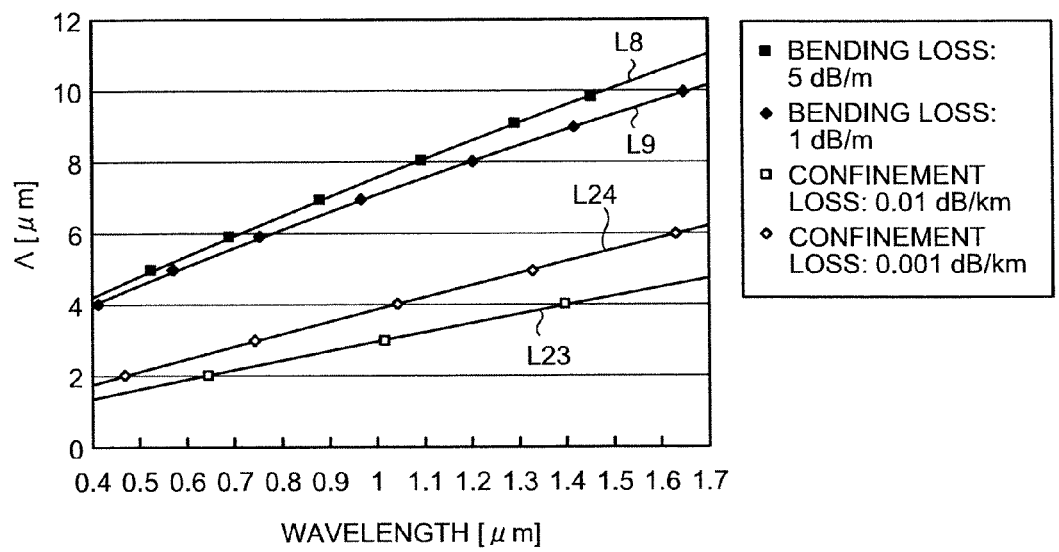
FIG. 11 is a diagram including both of lines indicating the minimum wavelengths where the bending loss become equal to or less than 5 dB/m or 1 dB/m as shown in FIG. 5, and lines indicating the maximum wavelengths where the confinement loss becomes equal to or less than 0.01 dB/km or 0.001 dB/km as shown in FIG. 9.

FIG. 11 is a diagram including both of the lines L8 and L9 indicating the minimum wavelengths where the bending loss becomes equal to or less than 5 dB/m or 1 dB/m as shown in FIG. 5, and the lines L23 and L24 indicating the maximum wavelengths where the confinement loss becomes equal to or less than 0.01 dB/km or 0.001 dB/km as shown in FIG. 9. In the optical transmission system 10 according to the first embodiment, the operation wavelength band is between 0.55 micrometers and 1.55 micrometers, and Λ is 5 micrometers in the HF 2. These conditions correspond to an area between the line L8 and the line L23. Therefore, the optical transmission system 10 can transmit each of the optical signals having the wavelengths included in the operation wavelength band with a low bending loss equal to or less than 5 dB/m, and a low confinement loss equal to or less than 0.001 dB/km.

Figure 12:
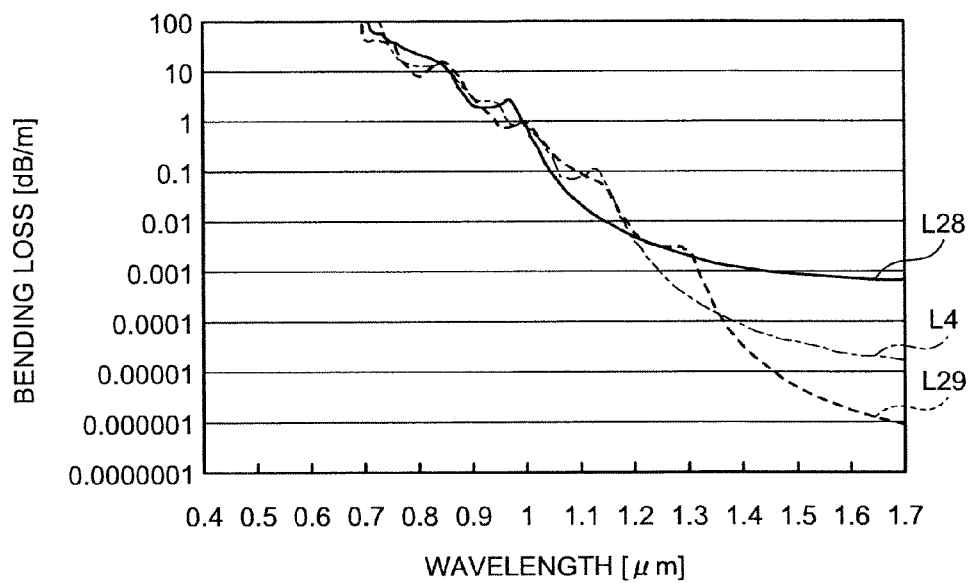
FIG. 12 is a schematic of wavelength dependency of the bending loss calculated using the FEM simulation by changing the number of hole layers from four to five and further to six while fixing d/$\Lambda$ to 0.43 and $\Lambda$ to 7 micrometers in the HF having holes arranged in a form of triangular lattice as shown in FIG. 2.

According to the first embodiment, the number of the hole layers are five in the HF 2; however, the present invention is not limited to such a number. Hole layer dependency of the bending loss in the HF will now be explained. FIG. 12 is a schematic of wavelength dependency of the bending loss in the HF having holes arranged in a form of triangular lattice as shown in FIG. 2. In this diagram, the wavelength dependency is calculated using the FEM simulation by changing the number of the hole layers from four to five and further to six while fixing d/Λ to 0.43 and Λ to 7 micrometers. Lines L28, L4, and L29 are curves representing the wavelength dependency of the bending loss when the number of the hole layers is four, five, or six, respectively. The line L4 is same as the line L4 shown in FIG. 3. As shown in FIG. 12, all of these lines L28, L4, and L29 indicate the bending loss rising toward the shorter end of the wavelengths. At the same time, the greater the number of the hole layer is, the smaller the bending loss becomes in the long wavelength domain. When the bending loss becomes equal to or higher than 1 dB/m, the influence thereof should be taken account for the transmission characteristics. However, in such a wavelength domain, the number of the hole layers does not make much difference.

Figures 13, 14:
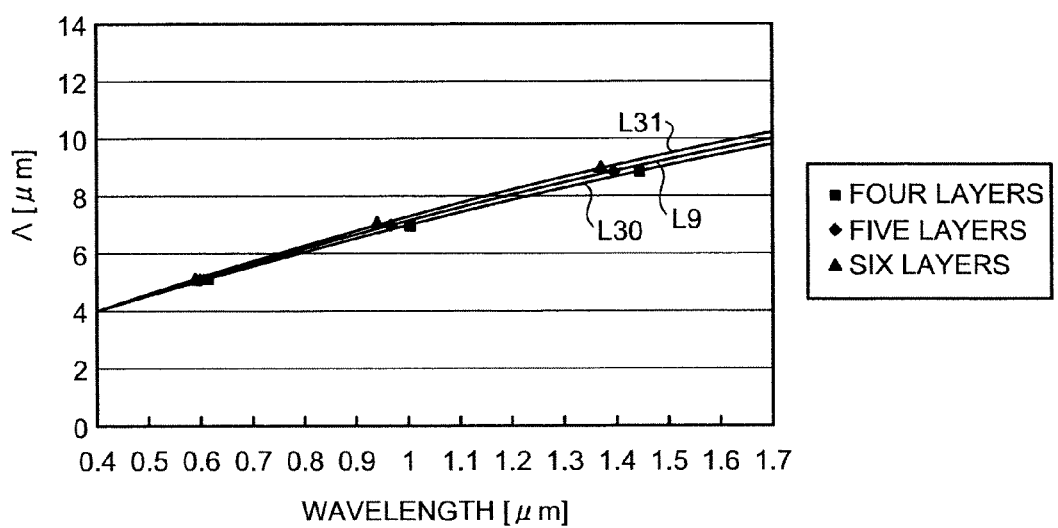
FIG. 13 is a schematic of a relationship between the number of the hole layers and the minimum wavelength where the bending loss becomes 1 dB/m in FIG. 12.
FIG. 14 is a graph plotting the relationship between the minimum wavelength and the number of the hole layers shown in FIG. 13.

FIG. 13 is a schematic of a relationship between the number of the hole layers and the minimum wavelength where the bending loss becomes 1 dB/m in FIG. 12. In other words, if a wavelength is longer than that shown in FIG. 13 for each number of the hole layers, the bending loss will become equal to or less than 1 dB/m. FIG. 14 is a graph plotting the relationship between the minimum wavelength and the number of the hole layers shown in FIG. 13. Lines L30, L9, and L31 are curves representing the relationships when the number of the hole layers is four, five, and six, respectively. The line L9 is same as the line L9 shown in FIG. 5. As shown in FIG. 14, the minimum wavelength, where the bending loss becomes equal to or less than 1 dB/m, is less affected by the number of the hole layers. Therefore, as long as $\Lambda$ is selected to satisfy the formula $\Lambda \leqq -0.739\lambda_s^2 + 6.3115\lambda_s + 1.5687$ in the same manner as in the HF 2, the bending loss of equal to or less than 1 dB/m can be realized using an HF having four or six hole layers, instead of the HF having five hole layers such as the HF 2 described above.

Figures 15, 16:
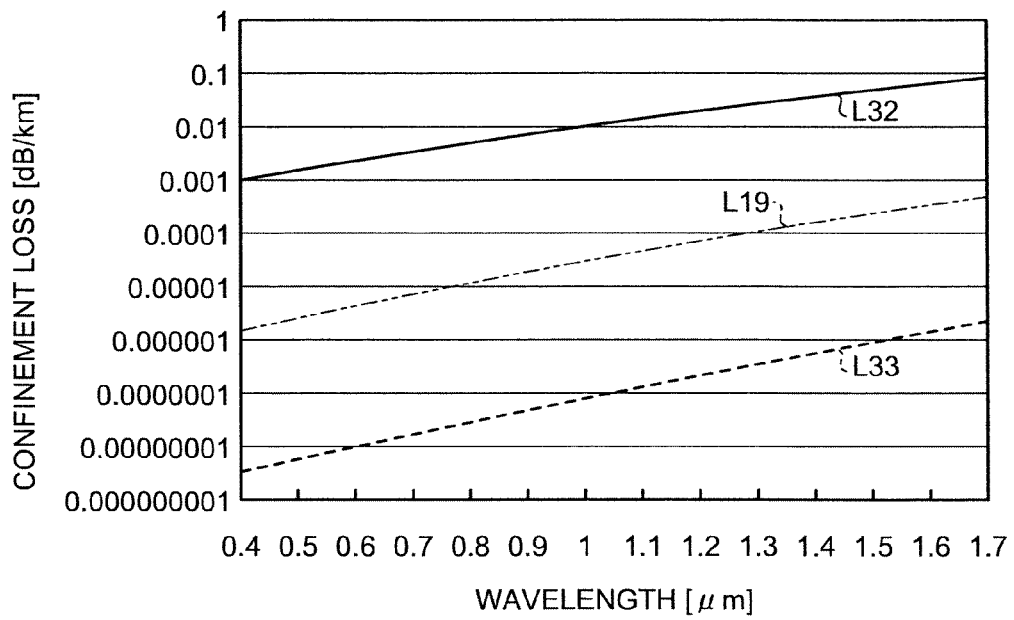
FIG. 15 is a schematic of wavelength dependency of the confinement loss calculated using the FEM simulation by changing the number of hole layers from four to five and further to six while fixing d/$\Lambda$ to 0.43 and $\Lambda$ to 7 micrometers in the HF having holes arranged in a form of triangular lattice as shown in FIG. 2.
FIG. 16 is a schematic of a relationship between the number of the hole layers and the maximum wavelength where the confinement loss becomes 0.001 dB/km in FIG. 15.

The hole layer number dependency of the confinement loss in the HF will now be explained. FIG. 15 is a schematic of wavelength dependency of confinement loss in the HF having the holes arranged in triangular lattice, as shown in FIG. 2. In this diagram, the wavelength dependency is calculated using the FEM simulation by changing the number of the hole layers from four to five and further to six while fixing d/$\Lambda$ to 0.43 and $\Lambda$ to 7 micrometers. Lines L32, L19, and L33 are curves representing the wavelength dependency of the confinement loss when the number of the hole layers is four, five, or six, respectively. The line L19 is same as the line 19 shown in FIG. 7. As shown in FIG. 15, any one of the lines L32, L19, and L33 indicates confinement loss rising toward longer end of the wavelengths. At the same time, the greater the number of the hole layer is, the smaller the confinement loss becomes.

Figures 17, 18:
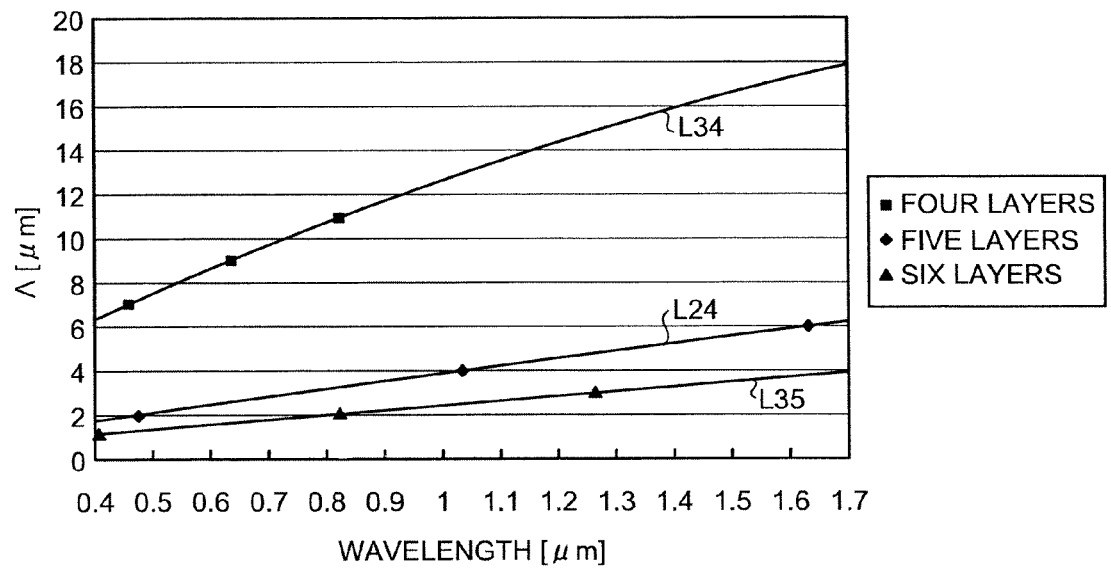
FIG. 17 is a graph plotting the relationship between the maximum wavelength and the number of the hole layers, shown in FIG. 16.
FIG. 18 is a schematic of a relationship between the combination of d/$\Lambda$ and $\Lambda$, the minimum wavelength where the bending loss becomes 1 dB/m, and the effective core area at the wavelength of 1.55 micrometers in the HF having the structure shown in FIG. 2.

FIG. 16 is a schematic of a relationship between the number of hole layers and the maximum wavelength where the confinement loss becomes 0.001 dB/km in FIG. 15. In other words, confinement loss equal to or less than 0.001 dB/km can be achieved at a wavelength shorter than that shown in FIG. 16 for each number of the hole layers. FIG. 17 is a graph plotting the relationship between the maximum wavelength and the number of the hole layers, shown in FIG. 16. Lines L34, L24, and L35 are curves representing the relationships when the number of the hole layers is four, five or six, respectively, and each of these curves is expressed by a formula $\Lambda = -2.0416\lambda_l^2 + 12.87\lambda_l + 1.7437$, $\Lambda = -0.0801\lambda_l^2 + 3.6195\lambda_l + 0.3288$, or $\Lambda = -0.0995\lambda_l^2 + 2.438\lambda_l + 0.337$. The line L24 is same as the line L24 shown in FIG. 9. Therefore, as long as $\Lambda$ is selected to satisfy the formula $\Lambda \geqq -2.0416\lambda_l^2 + 12.87\lambda_l + 1.7437$ when the number of the hole layer is four, and the formula $\Lambda \geqq -0.0995\lambda_l^2 + 2.438\lambda_l + 0.337$ when the number of the hole layer is six, the confinement loss of equal to or less than 0.001 dB/km can be realized using an HF having four or six hole layers, instead of the HF having five hole layers such as the HF 2 described above.

The number of optical signals used is not limited to three as described in the first embodiment. The number of optical signals may be any number of one or more as long as the optical signals is at a wavelength included in the operation wavelength band.

When an HF is used as an optical circuit, the larger an effective sectional area of the core is, the lower optical nonlinearity becomes. Therefore, when the effective sectional area is larger, it is advantageous for improving the transmission characteristics. The relationship between d/$\Lambda$ and $\Lambda$, the parameters of an HF, and the effective core area will now be explained.

Figures 19, 20:
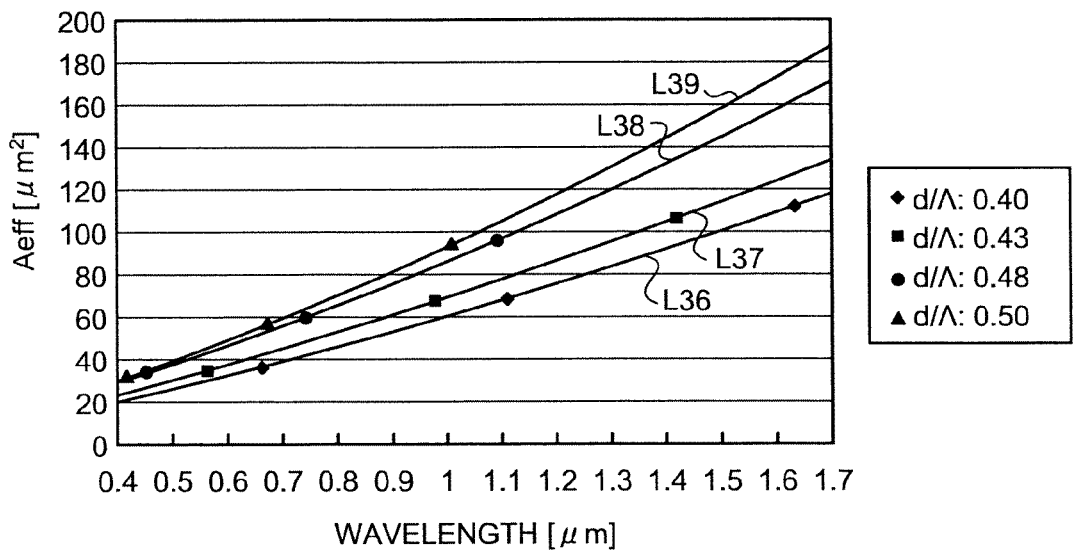
FIG. 19 is a graph plotting a relationship between the minimum wavelength where the bending loss becomes 1 dB/m and the effective core area, shown in FIG. 18.
FIG. 20 is a schematic of a relationship between the combination of d/$\Lambda$ and $\Lambda$, the maximum wavelength where the confinement loss becomes 0.001 dB/km, and the effective core area at the wavelength of 1.55 micrometers in the HF having the structure shown in FIG. 2.

FIG. 18 is a schematic of a relationship between the combination of d/$\Lambda$ and $\Lambda$, the minimum wavelength where the bending loss becomes 1 dB/m, and the effective core area (Aeff) when the wavelength is 1.55 micrometers in the HF having the structure shown in FIG. 2. FIG. 19 is a graph plotting the relationship between the minimum wavelength where the bending loss becomes 1 dB/m, and the effective core area as shown in FIG. 18. Lines L36 to L39 are curves representing the relationships when d/$\Lambda$ is 0.40, 0.43, 0.48, and 0.50, respectively. As shown in FIG. 19, when these parameters are combined so that the bending loss becomes 1 dB/m at the same minimum wavelength, the greater d/$\Lambda$ is, the larger the effective core area becomes.

Figure 21:
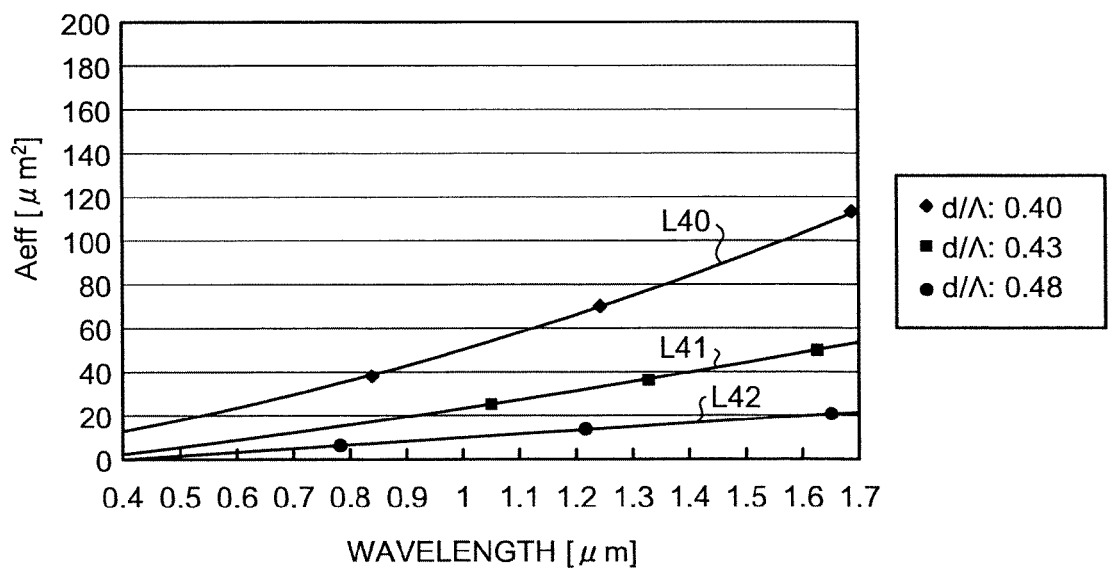
FIG. 21 is a graph plotting the relationship between the maximum wavelength where the confinement loss becomes 0.001 dB/km and the effective core area, shown in FIG. 20.

FIG. 20 is a schematic of a relationship between the combination of d/$\Lambda$ and $\Lambda$, the maximum wavelength where the confinement loss becomes 0.001 dB/km, and the effective core area when the wavelength is 1.55 micrometers in the HF having the structure shown in FIG. 2. FIG. 21 is a graph plotting the relationship between the maximum wavelength where the confinement loss becomes 0.001 dB/km and the effective core area as shown in FIG. 20. Lines L40 to L42 are curves representing the relationships when d/$\Lambda$ is 0.40, 0.43, and 0.48, respectively. As shown in FIG. 21, when these parameters are combined so that the confinement loss becomes 0.001 dB/km at the same maximum wavelength, the greater d/$\Lambda$ is, the larger the effective core area becomes, in the same manner as shown in FIG. 19. Therefore, upon designing an HF, it is preferable to use a combination of the parameters with d/$\Lambda$ as high as possible because the effective core area increases; however, d/$\Lambda$ should be kept equal to or less than 0.43 to maintain the ESM characteristic. In the above description, 1 dB/m and 0.001 dB/km are used as standard values of the bending loss and the confinement loss, respectively. However, the same conclusion can also be led when 5 dB/m and 0.01 dB/km are used as the standard values of the bending loss and the confinement loss, respectively.

Figure 22:
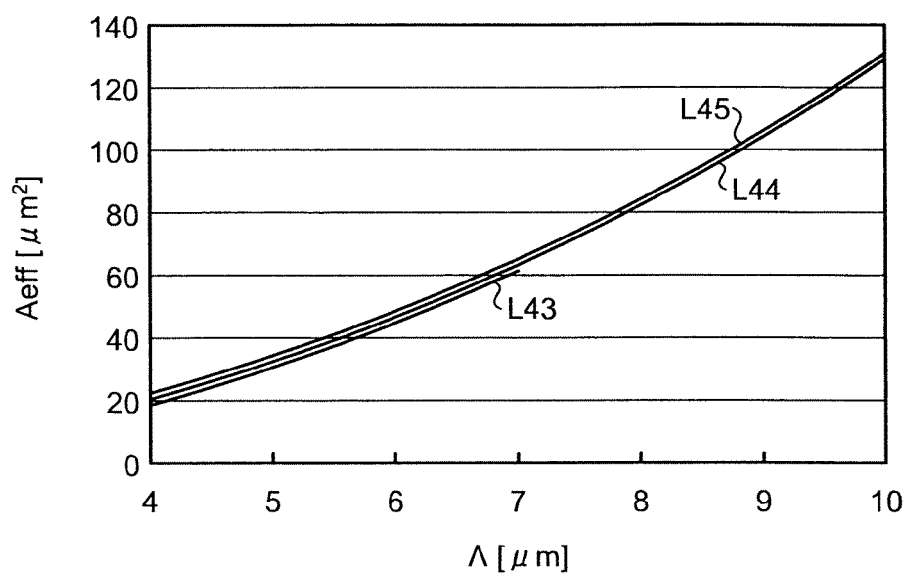
FIG. 22 is a schematic of a relationship between $\Lambda$ and the effective core area when the wavelength is at 0.55 micrometers, 1.05 micrometers, and 1.55 micrometers, respectively, and d/$\Lambda$ is fixed to 0.43, in the HF having the structure shown in FIG. 2.

FIG. 22 is a schematic of a relationship between $\Lambda$ and the effective core area when the wavelength is at 0.55 micrometers, 1.05 micrometers, and 1.55 micrometers, respectively, and d/$\Lambda$ is fixed to 0.43, in the HF having the structure shown in FIG. 2. Lines L43 to L45 are curves representing the relationships when the wavelength is 0.55 micrometers, 1.05 micrometers, and 1.55 micrometers, respectively. As shown in FIG. 22, the larger $\Lambda$ is, the greater the effective core area becomes at any of these wavelengths. Differences in these sectional core areas are small among these wavelengths.

Figures 23, 24:
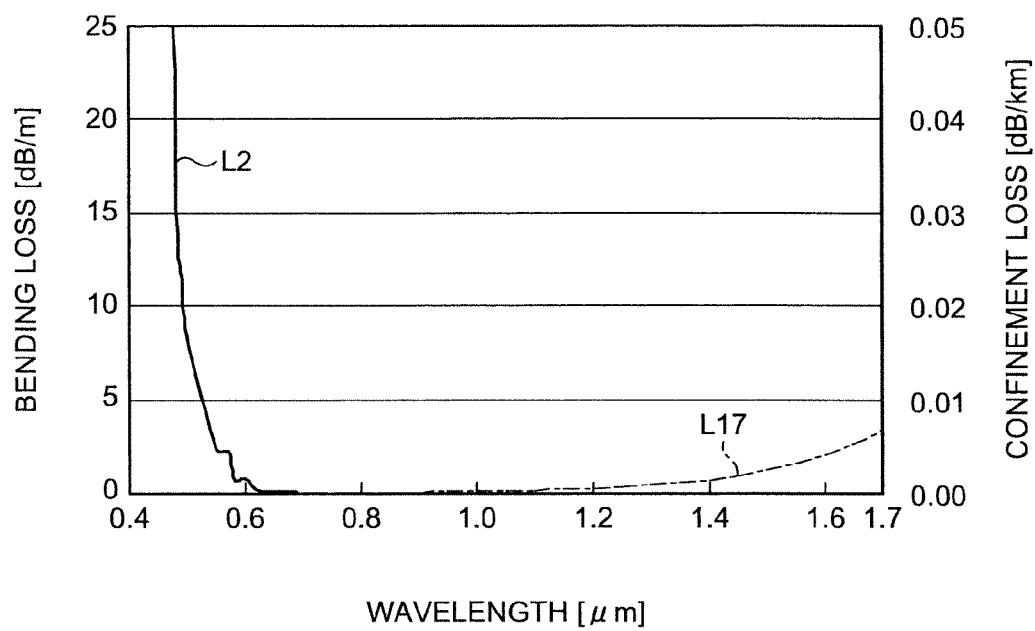
FIG. 23 is a schematic of optical characteristics of an HF with d/$\Lambda$=0.43 and $\Lambda$=5 micrometers at each of the wavelengths.
FIG. 24 is a schematic of the wavelength dependency of the bending loss and the confinement loss in the HF with d/$\Lambda$=0.43 and $\Lambda$=5 micrometers.

FIG. 23 is a schematic of optical characteristics of an HF with d/$\Lambda$=0.43 and $\Lambda$=5 micrometers at each of the wavelengths. In FIG. 23, "Aeff" indicates the effective core area. FIG. 24 is a schematic of the wavelength dependency of the bending loss and the confinement loss in the HF with d/$\Lambda$=0.43 and $\Lambda$=5 micrometers. The lines L2 and L17 are same as those respectively shown in FIG. 3 and FIG. 7. As shown in FIGS. 23 and 24, the HF having d/$\Lambda$=0.43 and $\Lambda$=5 micrometers realizes a low bending loss equal to or less than 5 dB/m and a low confinement loss equal to or less than 0.01 dB/km at wavelengths between 0.55 and 1.55 micrometers. Also, as shown in FIG. 23, it has been confirmed that the effective core area is little dependent on the wavelength, and the wavelength dispersion is greatly dependent on the wavelength.

Figure 25:
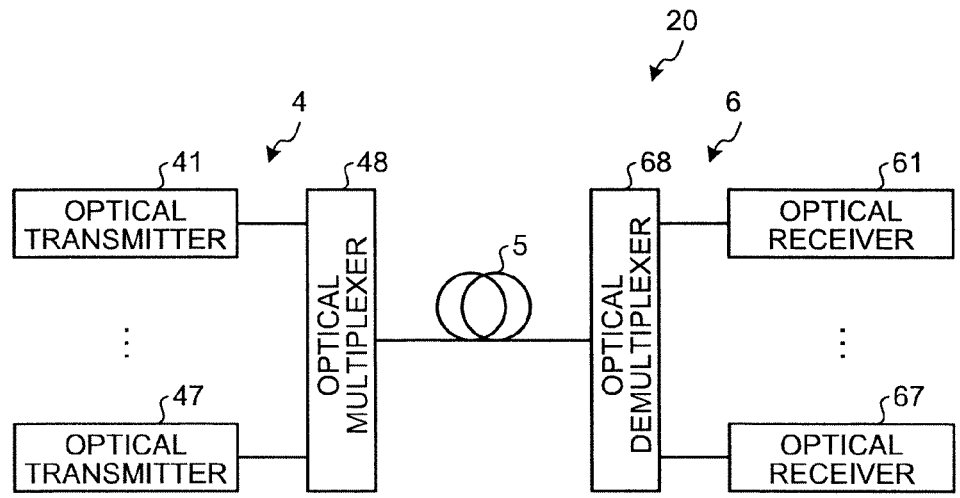
FIG. 25 is a block diagram of an optical transmission system according to a second embodiment of the present invention.

FIG. 25 is a block diagram of an optical transmission system 20 according to a second embodiment of the present invention. As shown in FIG. 25, the optical transmission system 20 according to the second embodiment includes an optical transmitting apparatus 4, a multi-core HF 5 connected to the optical transmitting apparatus 4, and an optical receiving apparatus 6 connected to the multi-core HF 5. The optical transmitting apparatus 4 further includes seven optical transmitters 41 to 47, each outputting an optical signal having a different wavelength from each other, and an optical multiplexer 48 multiplexing each of the signals output from the optical transmitters 41 to 47 and outputting the multiplexed signal to the multi-core HF 5. The optical receiving apparatus 6 includes an optical demultiplexer 68 demultiplexing the optical signal multiplexed and transmitted over the multi-core HF 5 from the multi-core HF 5, and optical receivers 61 to 67 respectively receiving each of the demultiplexed signals.

The optical signals output from the optical transmitters 41 to 47 are, for example, laser beams modulated by a NRZ signal whose modulation speed is 10 Gbps. A wavelength of each of these optical signals is 0.55 micrometers, 0.85 micrometers, 0.98 micrometers, 1.05 micrometers, 1.31 micrometers, 1.48 micrometers, and 1.55 micrometers, respectively. These wavelengths are distributed in a broad wavelength bandwidth having a center thereof at approximately 1 micrometer.

Figure 26:
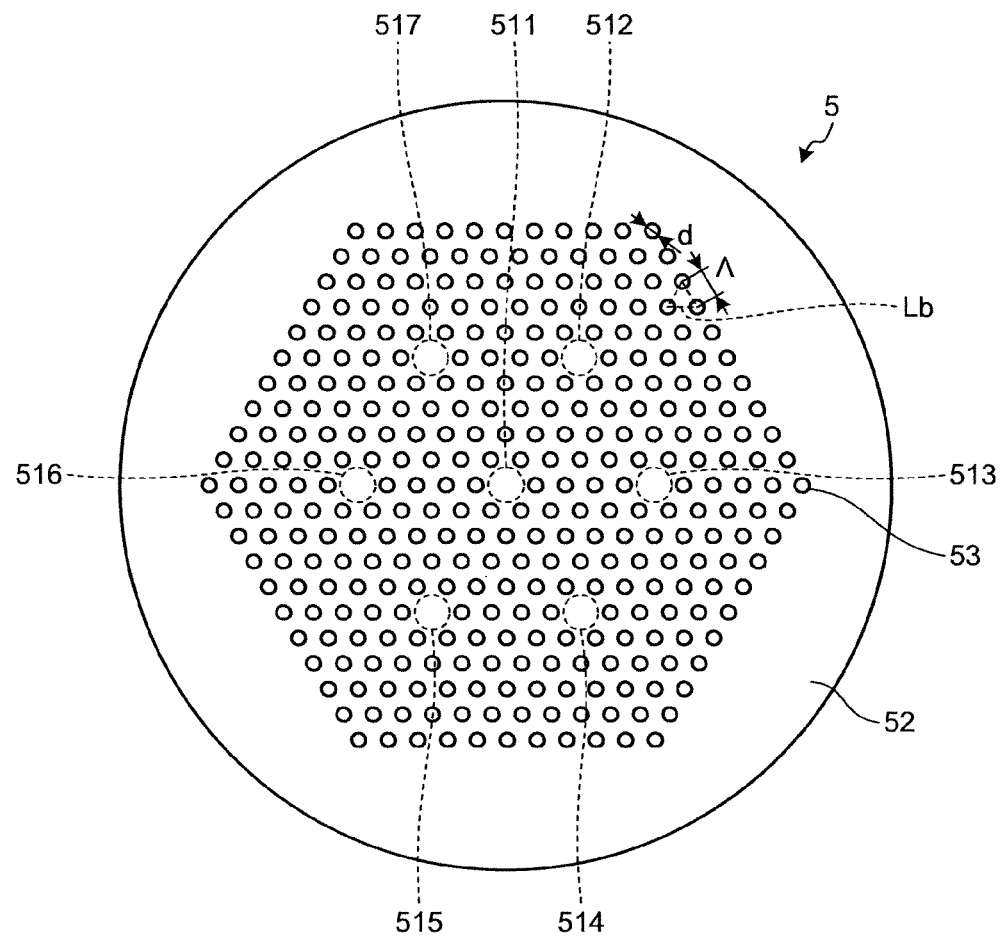
FIG. 26 is a schematic sectional view of a multi-core HF shown in FIG. 25.

A specific structure of the multi-core HF 5 will now be explained. FIG. 26 is a schematic sectional view of the multi-core HF 5 shown in FIG. 25. As shown in FIG. 26, the multi-core HF 5 includes cores 511 to 517 arranged separately from each other, and a cladding 52 arranged around the external circumference of the cores 511 to 517. The core 511 is arranged at the approximate center of the cladding 52, and the cores 512 to 517 are disposed at the tips of a regular hexagon having the center thereof at the core 511. The cladding 52 is provided with a plurality of the holes 53 arranged at intervals around the cores 511 to 517. The holes 53 are arranged in a form of triangular lattice Lb in layers of regular hexagons to surround each of the cores 511 to 517. In the multi-core HF 5, each of the cores 511 to 517 are surrounded by at least five layers of the holes, and four holes 53 are disposed between each of the cores 511 to 517. The cores 511 to 517 and the cladding 52 are made of silica based glass.

The optical multiplexer 48 multiplexes the optical signals, each output from each of the optical transmitters 41 to 47, onto each of the cores 511 to 517 of the multi-core HF 5. Thus, the optical signals output from the optical transmitters 41 to 47 are transmitted over different cores 511 to 517. The optical demultiplexer 68 demultiplexes each of the optical signals transmitted over each of the cores 511 to 517 of the multi-core HF 5 from the multi-core HF 5, and guides each of the optical signals to the optical receivers 61 to 67. Each of the optical receivers 61 to 67 receives each of the demultiplexed optical signals, and extracts the NRZ signal from each of the demultiplexed optical signals as an electrical signal.

The optical multiplexer 48 is realized by a multiplexer/demultiplexer of a waveguide type such as an array waveguide grating (AWG), a fiber spliced type, or a spatial coupling type, for example, having seven standard single-mode optical fibers at the optical input end, and a single multi-core HF with the same structure as the multi-core HF 5 at the optical output end. A demultiplexer having the same structure as the optical multiplexer 48 may be used as the optical demultiplexer 68.

When the diameter of the holes 53 is denoted as d [μm], and the lattice constant of the triangular lattice La is denoted as $\Lambda$ [μm], d/$\Lambda$ is 0.43. As a result, in the same manner as the HF 2 according to the first embodiment, the multi-core HF 5 realizes the ESM characteristics across the entire operation wavelength band that is from 0.55 micrometers to 1.55 micrometers. Furthermore, in this multi-core HF 5, when 0.55 micrometers, the minimum wavelength in the operation wavelength band, is denoted as $\lambda_s$ [μm], $\Lambda$ is set to 5 micrometers correspondingly to $\lambda_s$ so that $\Lambda \leq -0.518\lambda_s^2 + 6.3617\lambda_s + 1.7468$ is established. As a result, in the multi-core HF 5, a bending loss will be equal to or less than 5 dB/m at the wavelengths of each of the optical signals included in the operation wavelength band, in the same manner as in the HF 2 according to the first embodiment. Therefore, the multi-core HF 5 can single-mode transmission each of the optical signals with a bending loss that is practically low enough. As described above, the optical transmission system 20 is possible to single-mode transmission optical signals across a broad bandwidth with low bending loss, as well as to realize a large capacity transmission over SDM.

Furthermore, $\Lambda$ in the multi-core HF 5 is not limited to 5 micrometers, in the same manner as the first embodiment. As long as $\Lambda$ is set in the multi-core HF 5 correspondingly to $\lambda_s$, that is the minimum wavelength within the operation wavelength band, so that $\Lambda \leq -0.518\lambda_s^2 + 6.3617\lambda_s + 1.7468$ is established, it is possible to bring the bending loss to equal to or less than 5 dB/m at the wavelength of each of the optical signals.

Furthermore, also for the confinement loss, when 1.55 micrometers, the maximum wavelength in the operation wavelength band, is denoted as $\lambda_l$ [μm], because $\Lambda$ is set to 5 micrometers with the multi-core HF 5, $\Lambda \geq -0.1452\lambda_l^2 + 2.982\lambda_l + 0.1174$ is established. As a result, the multi-core HF 5 achieves a confinement loss equal to or less than 0.01 dB/km that is sufficiently low at each of the wavelength of the optical signals, in the same manner as the HF 2 according to the first embodiment.

Furthermore, $\Lambda$ in the multi-core HF 5 is not limited to 5 micrometers, in the same manner as the first embodiment. As long as $\Lambda$ is set in the multi-core HF 5 correspondingly to $\lambda^1$, that is the maximum wavelength within the operation wavelength band, so that $\Lambda \geq -0.1452\lambda_l^2 + 2.982\lambda_l + 0.1174$ is established, it is possible to bring the confinement loss to equal to or less than 0.01 dB/km at the wavelength of each of the optical signals.

Furthermore, when the operation wavelength band is between 0.55 micrometers and 1.55 micrometers, and $\Lambda$ is 5 micrometers in the multi-core HF, this condition corresponds to the area between the line L8 and the line L23 in FIG. 11. Therefore, such a multi-core HF can transmit each of the optical signals at the wavelengths included in the operation wavelength band with a low bending loss equal to or less than 5 dB/m, as well as with a low confinement loss equal to or less than 0.01 dB/km.

The multi-core HF 5 according to the second embodiment will now be explained more specifically. In the explanation below, the multi-core HF 5 is compared with an HF having the same structure as the HF 2 according to the first embodiment (hereinafter, referred to as "single-core HF" as appropriate). For both of the multi-core HF 5 and the single-core HF, the design parameters are set to d/$\Lambda$=0.43 and $\Lambda$=5 micrometers. The cores 512 to 517 have the same symmetrical property including the arrangement of the holes 53 arranged therearound; therefore, only the characteristics of the core 511, disposed at the center, and the core 513 will be explained below.

Figure 27:
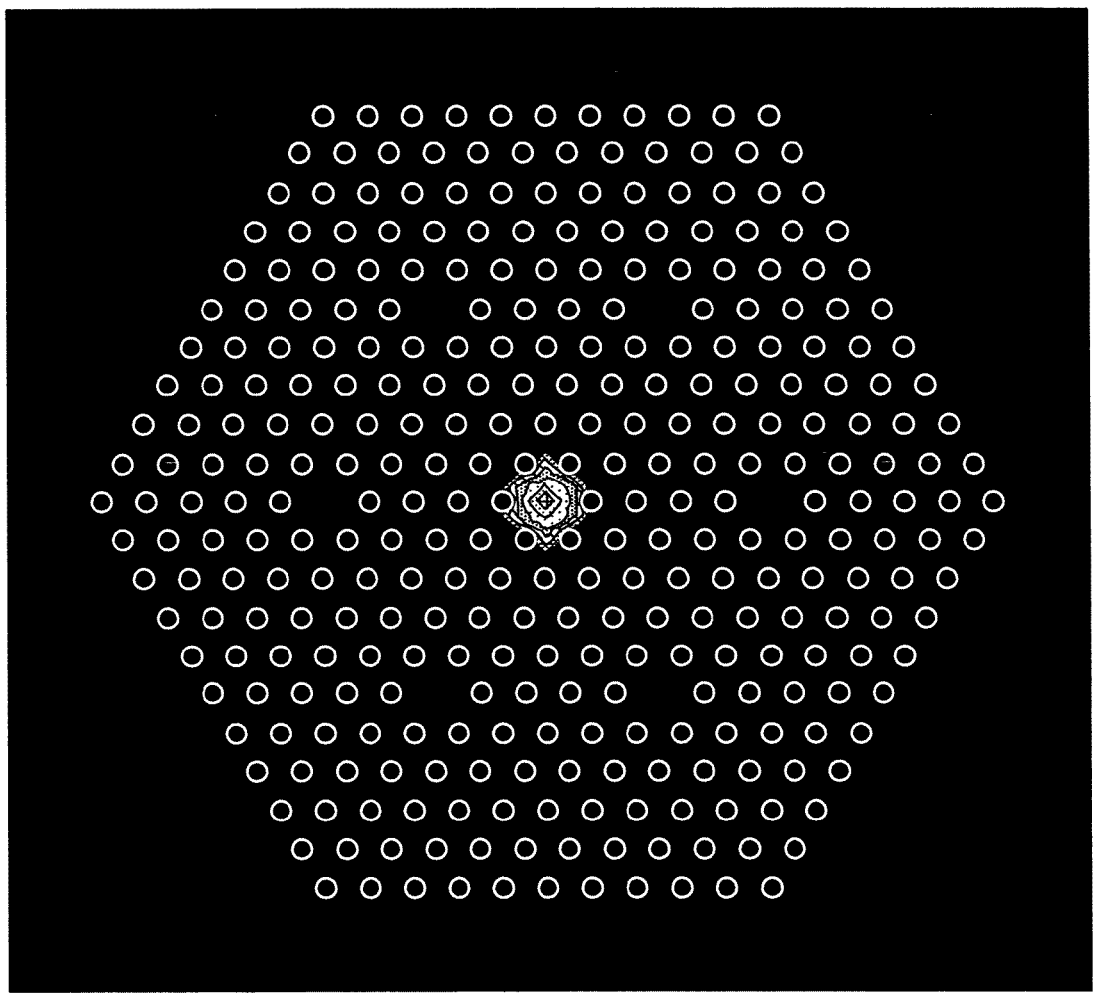
FIG. 27 is a schematic of a field distribution of light having a wavelength of 1.55 micrometers and propagating through a core in the multi-core HF.
Figure 28:
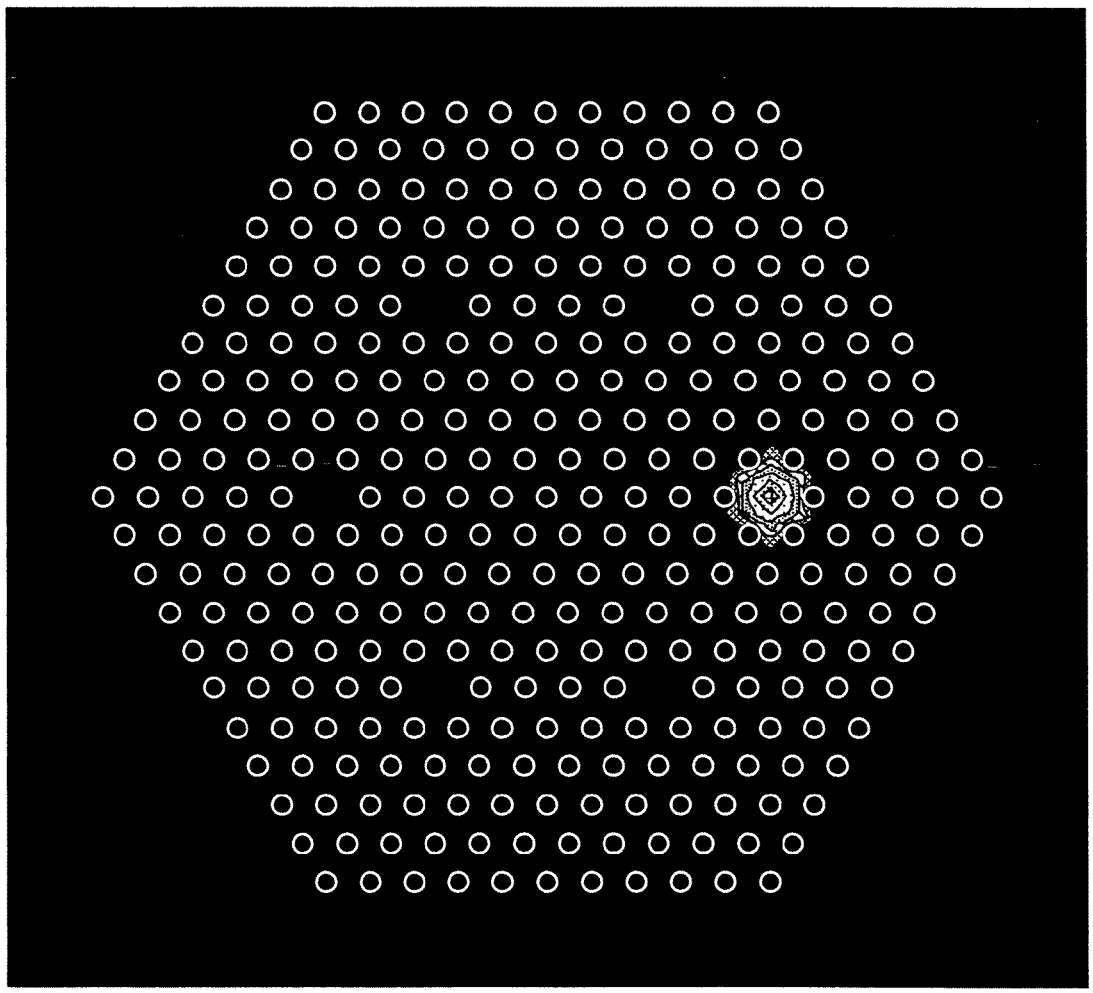
FIG. 28 is a schematic of a field distribution of light having a wavelength of 1.55 micrometers and propagating through a core in the multi-core HF.

FIGS. 27 and 28 are schematics of field distributions of light having a wavelength of 1.55 micrometers and propagating thorough the core 511 and the core 513 in the multi-core HF 5, respectively. In FIGS. 27 and 28, the hatched area in the core indicates the field distribution of the light. In this area, the peak around the center is set to 1, and the hatched pattern is changed for every 0.1. As shown in FIGS. 27 and 28, the light is confined within the core and propagates through either the core 511 or the core 513.

Figures 29, 30:
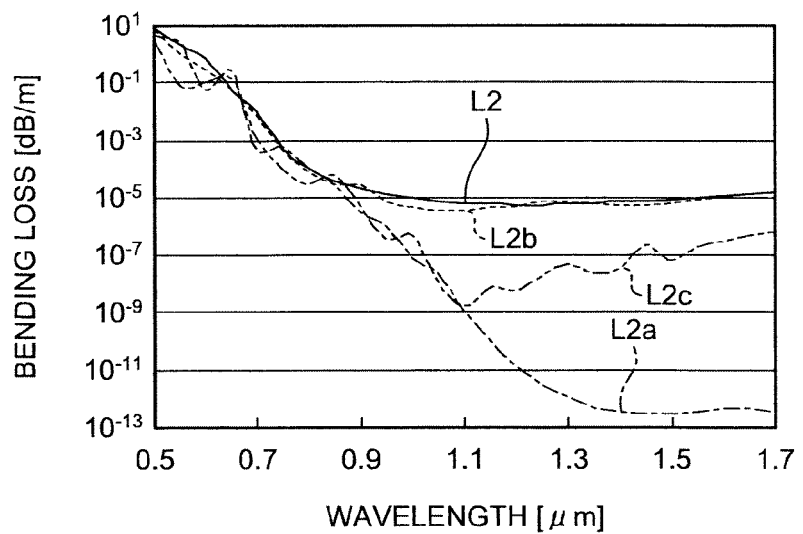
FIG. 29 is a schematic of a confinement loss, a wavelength dispersion, an effective core area, and a bending loss at the wavelength of 1.55 micrometers in a single-core HF and the multi-core HF.
FIG. 30 is a schematic of wavelength dependency of bending losses in the single-core HF and the multi-core HF.

FIG. 29 is a schematic of a confinement loss, a wavelength dispersion, an effective core area, and a bending loss at the wavelength of 1.55 micrometers in the single-core HF and the multi-core HF 5. In FIG. 29, the "SINGLE-CORE" indicates the characteristics of the single-core HF, and the "MULTI- CORE 511" and the "MULTI-CORE 513" respectively indicate the characteristics of the core 511 and the core 513 of the multi-core HF 5 when light propagates therethrough. The bending loss of the multi-core HF 5 indicates the loss that occurs when the multi-core HF 5 is bent so that the core 513 would come to the inner circumference, and the core 516 would come to the outer circumference on the surface where the cores 511, 513, and 516 are disposed. As shown in FIG. 29, the wavelength dispersions and the effective sectional areas of the core were all the same for the multi-core 511, the multi-core 513, and the single-core. The confinement loss and the bending loss were slightly smaller in the multi-core 513 than those in the single-core, and much smaller in the multi-core 511. It can be considered that the confinement loss and the bending loss are different in each of these scenarios because of the difference in the number of the holes provided around each of the cores. In other words, it can be considered that the confinement loss and the bending loss are extremely low because the number of the holes located around the multi-core 511 is much greater than those around the single-core having the five hole layers.

FIG. 30 is a schematic of wavelength dependency of the bending losses in the single-core HF and the multi-core HF 5. A line L2 indicates a spectral curve in the single-core, and is same as the line L2 shown in FIGS. 3 and 24. Lines L2a, L2b, and L2c are spectral curves in the cores 511, 513, and 516, respectively, in the multi-core HF 5. As shown in FIG. 30, the bending losses are low especially in the lines L2a and L2c. This is because the confinement loss has a great influence in an area where the wavelengths is equal to or less than 1 micrometer where the bending loss is low from the beginning. On the contrary, in the area where the wavelength is equal to or less than 0.8 micrometers where the confinement loss is low and the influence of the bending loss becomes dominant, almost the same tendency is seen for all of these lines. In other words, the bending loss in the multi-core HF 5 has a characteristic similar to that of the single-core HF, regardless of where the core is located.

As shown in FIGS. 29 and 30, the multi-core HF 5 according to this embodiment has characteristics equal to or better than those of the single-core HF having the same design parameters. Therefore, the relationship between the operation wavelength band and the design parameters in the HF 2, explained in the first embodiment, and the optical characteristics realized thereby also applies to the multi-core HF 5. In other words, the bending loss can be made equal to or less than 5 dB/m at the wavelength of each of the optical signals, for example, if $\Lambda$ is set in the multi-core HF 5 so that $\Lambda \leq -0.518 \lambda_s^2 + 6.3617 \lambda_s + 1.7468$ is established correspondingly to $\lambda_s$ that is the minimum wavelength included in the operation wavelength band. Furthermore, the confinement loss can be brought to equal to or less than 0.01 dB/km at the wavelength of each of the optical signals, by allowing the formula $\Lambda \geq -0.1452 \lambda_l^2 + 2.982 \lambda_l + 0.1174$ to be established with respect to $\lambda_l$ that is the maximum wavelength included in the operation wavelength band.

Figure 31:
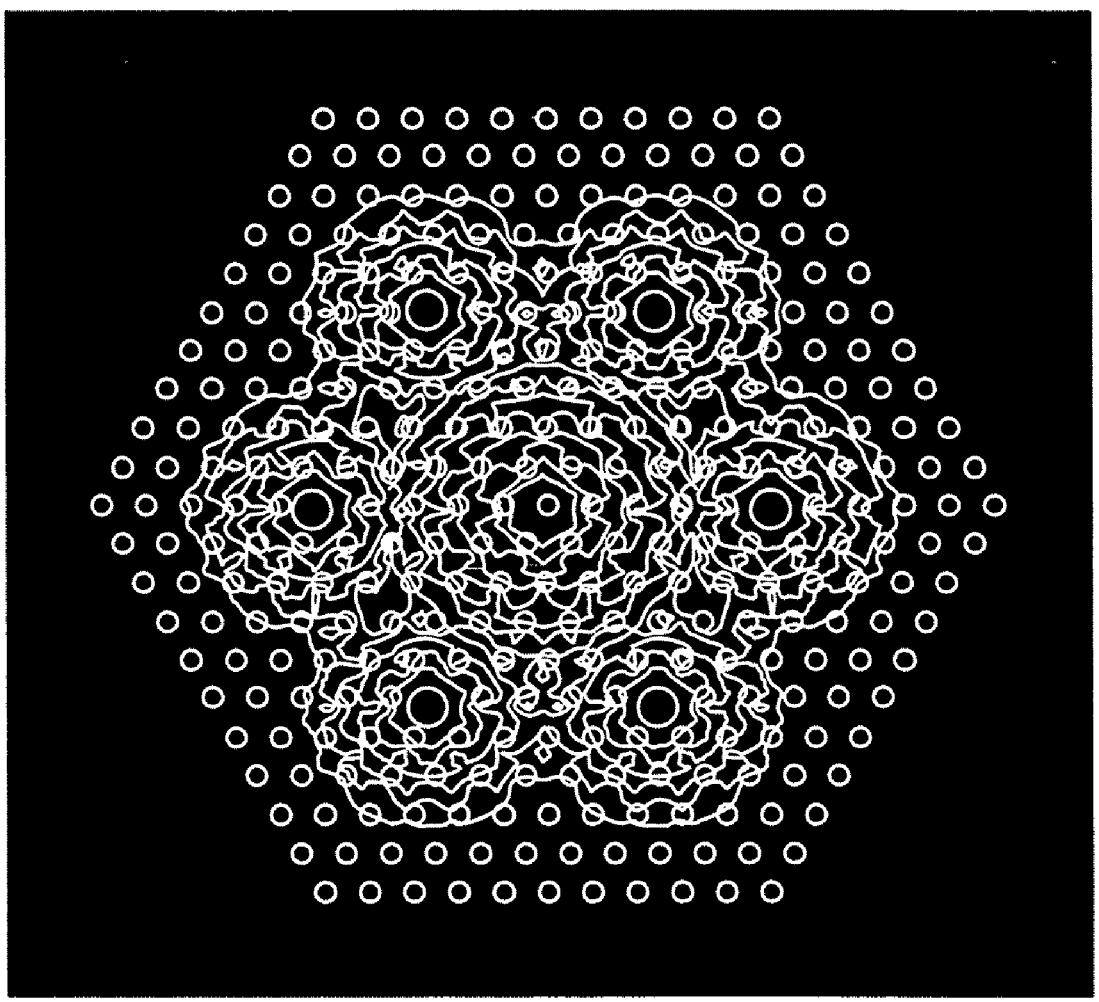
FIG. 31 is a schematic of field distribution of light intensity, shown in contour lines, when the light propagates through a core of the multi-core HF at the wavelength of 1.55 micrometers.
Figure 32:
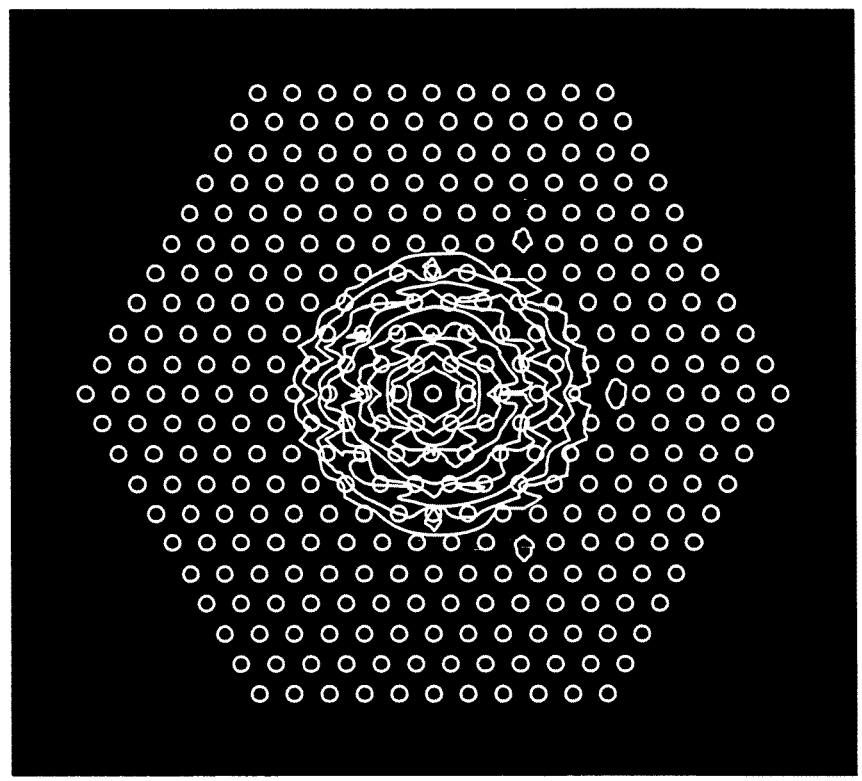
FIG. 32 is a schematic of field distribution of light intensity, shown in contour lines, when the multi-core HF, shown in FIG. 31, is bent.

Field distributions of light, when the multi-core HF 5 is bent, will now be explained. FIG. 31 is a schematic of a field distribution of light intensity, shown in contour lines, when the light propagates through the core 511 of the multi-core HF 5 at the wavelength of 1.55 micrometers. In FIG. 31, the contour lines are provided for each 5 dB from the peak thereof to −50 dB. As shown in FIG. 31, when the light propagates through the core 511, the field intensity of the light in the adjacent cores 512 to 517 is lower than the peak by approximately −20 dB. On the contrary, FIG. 32 is a schematic of a field distribution of light intensity, shown in contour lines, when the multi-core HF 5 shown in FIG. 31 is bent. As shown in FIG. 32, when the multi-core HF 5 is bent, the light becomes concentrated at the core 511. Therefore, it was confirmed that no excessive loss or interference would occur even when the multi-core HF 5 is bent.

Figure 33:
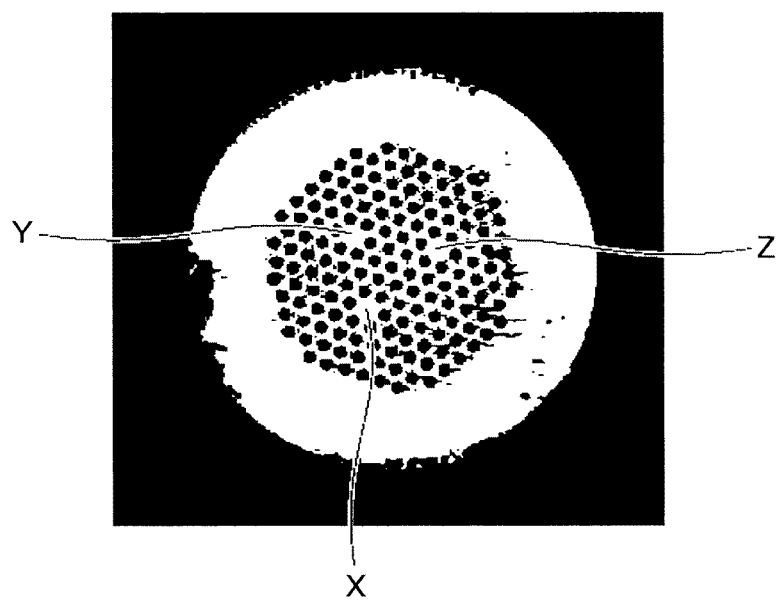
FIG. 33 is a sectional photograph of the manufactured multi-core HF.

Then, a multi-core HF, having three cores, was manufactured using a known stack-and-draw technique to check the basic characteristics of a multi-core HF. FIG. 33 is a sectional photograph of the manufactured multi-core HF. The reference letters X, Y, and Z point to the cores. The design parameters of the holes, in this multi-core HF, is set as d/Λ=0.43, and Λ=5 micrometers. Each of the cores X, Y, and Z is surrounded by at least four layers of holes. With respect to the distances between the cores X, Y, and Z, the cores X and Y are separated by three hole layers, and the cores X and Z are separated by four hole layers.

Light was injected from one end of this multi-core HF having a length of 2 meters. By propagating the light therethrough to measure the optical characteristics of the core X, the wavelength dispersion of 43.6 ps/nm/km and the effective core area of 35.9 square micrometers were obtained. These results were almost same as calculated values shown in FIG. 29. FIG. 34 is a schematic of wavelength dependency of a bending loss when the light was propagated through the core X of this multi-core HF. As shown in FIG. 34, the bending losses were quite good and equal to or less than 2 dB/m across the wavelengths between 0.6 micrometers and 1.7 micrometers.

Crosstalk was then measured between the cores of the multi-core HF having a length of 2 meters in the manner described below. That is, light was injected from one end of the multi-core HF to cause the light propagate through the core X; and an optical output received from the core X, and optical outputs leaked from the core X to the cores Y and Z were measured at the other end to calculate the crosstalk based on the ratio of these measurements. FIG. 35 is a schematic of the measurement results of the crosstalk in the manufactured multi-core HF. The "X-Y" indicates the crosstalk between the cores X and Y, and the "X-Z" indicates the crosstalk between the cores X and Z. Light beams of two wavelengths, 0.85 micrometers and 1.55 micrometers, were used for these measurements. These measurements were performed without a great bend of the multi-core HF, except for the measurement with the light beam having the wavelength 0.85 micrometers. This measurement was made with the multi-core HF wound for one time at a diameter of 20 millimeters. As shown in FIG. 35, the crosstalk was equal to or less than −20 dB between the cores X-Z, having the distance of four hole layers, at either wavelength of 0.85 micrometers or 1.55 micrometers. At the wavelength of 0.85 micrometers that is the wavelength of the crosstalk was lower, the crosstalk was improved when the multi-core HF was bent, in comparison with that without being bent, in the same manner as the calculations indicated in FIGS. 31 and 32.

As described above, the interference can be suppressed between the cores to improve the crosstalk, by applying a bend to the multi-core HF. Therefore, the optical transmission system 20 according to the second embodiment may further include a bend applying unit that applies a bend to the multi-core HF 5 so that this characteristic can be leveraged. FIG. 36 is a schematic of an exemplary bend applying unit included in the optical transmission system 20 according to the second embodiment. A bobbin 7, that is the bend applying unit, is made of metal or resin, for example, and has a diameter of 20 millimeters, for example. The multi-core HF 5 is wound around the bobbin 7 one or more times. In this manner, the crosstalk between the cores of the multi-core HF 5 can be improved, in comparison with that without the bobbin 7.

The crosstalk can also be improved by applying a lateral pressures to the multi-core HF, in the same manner by applying a bend thereto. FIG. 37 is a schematic of an exemplary lateral pressure applying unit included in the optical transmission system 20 according to the second embodiment. Lateral pressure applying members 8, which are the lateral pressure applying unit, include two board-like members 8a and 8b made of metal or resin, for example. These board-like members 8a and 8b hold the multi-core HF 5, wound one or more times at a diameter of 20 millimeters, therebetween to apply lateral pressures to the multi-core HF 5. In this manner, the crosstalk between the cores of the multi-core HF 5 can be improved, in comparison with that without the lateral pressure applying members 8.

The bobbin 7 or the lateral pressure applying members 8 may be provided in a singularity, or in a plurality separated from each other by a predetermined distance, in one section of the optical circuit, that is between an optical transmitting apparatus or an optical relay apparatus and another optical relay apparatus or an optical receiving apparatus. Moreover, the bobbin 7 and the lateral pressure applying members 8 may be used in combination. Furthermore, for suppressing the interference between the cores, it is also possible to use a slot, used for placing the multi-core HF 5 in an optical cable and lay down the optical cable, as any one of the bend applying unit or the lateral pressure applying unit or both. Such a slot is usually designed so that a bend or a lateral pressure, applied to the optical fiber, is minimized. However, if the slot is designed intentionally to have a diameter, a diameter thereof, a diameter of a spiral groove, or a pitch of a spiral groove thereof so that a bend or lateral pressures is applied to suppress that the interference between the cores of the multi-core HF 5, such a slot can be used as the bend applying unit or the lateral pressure applying unit. However, it is preferable that any of the bend applying unit or the lateral applying unit or both only applies a bend to a degree that the bending loss will be approximately equal to or less than 3 dB, for example. In this manner, the bend does not result in an excessive bending loss within one section of an optical circuit.

The optical transmission system according to the present invention is not limited to those described in the first and the second embodiments. For example, a desired bending loss can be realized in an operation wavelength band by setting $\Lambda$ of the HF 2 or the multi-core HF 5 appropriately to make the minimum wavelength, included in the operation wavelength band, longer than those shown as the line L8 or L9 in FIG. 11. Furthermore, a desired confinement loss can be realized by setting $\Lambda$ of the HF appropriately to make the maximum wavelength, included in the operation wavelength band, shorter than those shown as the line L23 or L24.

To explain it more specifically with an example, if the operation wavelength band is between 0.55 micrometers and 1.7 micrometers, $\Lambda$ of the HF or the multi-core HF is 5 micrometers, and $d/\Lambda$ thereof is 0.43, then the bending loss becomes equal to or less than 5 dB/m, the confinement loss becomes equal to or less than 0.01 dB/km, and the single-mode transmission can be achieved. Moreover, if the operation wavelength band is between 1.0 micrometers and 1.7 micrometers, $\Lambda$ of the HF or the multi-core HF is 7 micrometers, and $d/\Lambda$ thereof is 0.43, then the bending loss becomes equal to or less than 1 dB/m and the confinement loss becomes equal to or less than 0.001 dB/km at the wavelength of each of the optical signals, while the single-mode transmission is also achieved.

According to the second embodiment, the number of the cores in the multi-core HF 5 was seven, however, the number of the cores is not especially limited thereto. Furthermore, according to the second embodiment, the optical signals having different wavelengths are multiplexed onto the different cores of the multi-core HF 5; however, the optical signals having the same wavelength may also be multiplexed. Moreover, the optical transmitters 41 to 47 may output wavelength-division-multiplexed-(WDM) light, and the WDM light may be multiplexed onto each of the cores in the multi-core HF 5. The number of the optical signals is not especially limited, e.g., may be between 1 and 400, as long as the optical signals are at the wavelengths included in the operation wavelength band.

As described above, according to the present invention, the present invention can advantageously realize an optical transmission system that can transmit optical signals across a broad bandwidth in the single mode with a low bending loss.

Assuming that, in the multi-core HF shown in FIG. 33, the cores that are three-fold rotational symmetric around the center axis of the cladding are in a standard arrangement, only the core X is arranged at a position offset from the standard arrangement. As a result, a core of the multi-core HF can be advantageously connected easily upon connecting a specific core thereof to a specific core of another multi-core HF or to an optical apparatus by way of fusion splicing, connector, or mechanical splicing. The multi-core HF having such an offset core will now be explained specifically under a third embodiment of the present invention.

Figure 38:
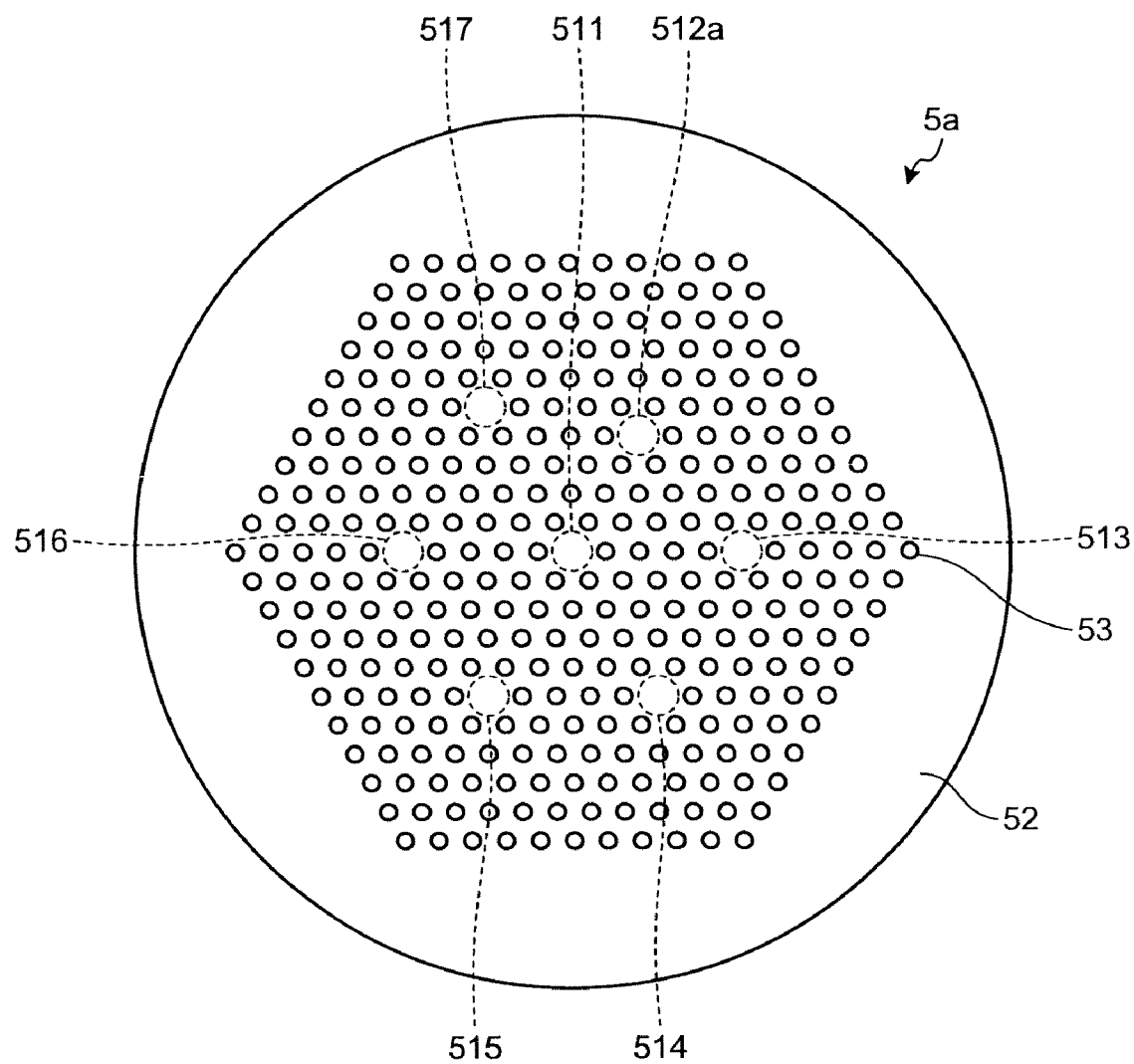
FIG. 38 is a schematic sectional view of a multi-core HF according to a third embodiment of the present invention.

FIG. 38 is a schematic sectional view of a multi-core HF 5a according to the third embodiment. The multi-core HF 5a is different from the multi-core HF 5 in that a core 512a, corresponding to the core 512 of the multi-core HF 5 shown in FIG. 26, is offset from the position of the core 512 by the lattice constant $\Lambda$ toward the side of the core 511. The other cores 511, and 513 to 517, the cladding 52, the holes 53 have the same structures as those in the multi-core HF 5.

The cores 511 to 517 in the multi-core HF 5 are arranged in six-fold rotational symmetry around the center axis of the cladding 52; on the contrary, in the multi-core HF 5a, when the cores that are six-fold rotational symmetric around the center axis of the cladding 52 are considered as in a standard arrangement, only one of the cores, i.e., the core 512a, is arranged at a position offset from the standard arrangement.

Figure 39:
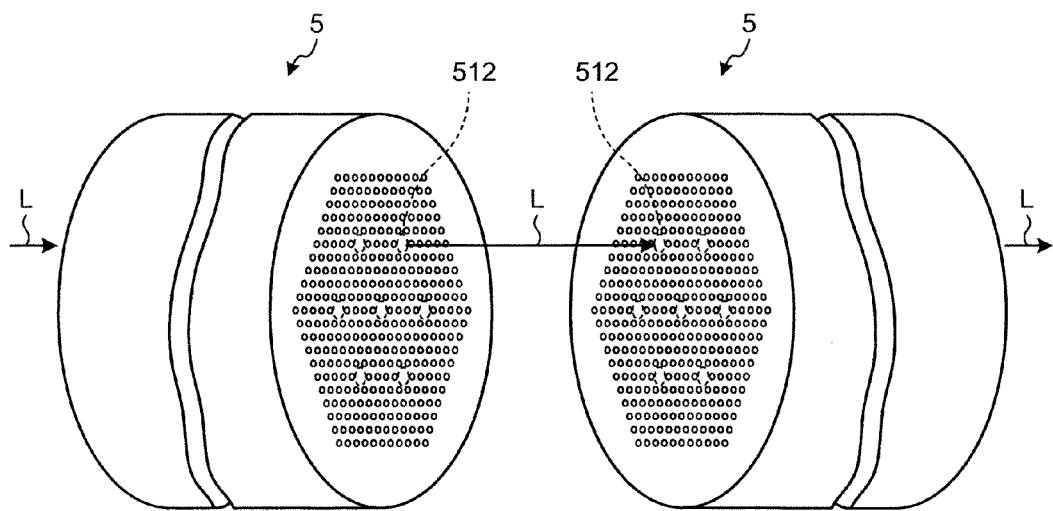
FIG. 39 is a schematic for explaining connection of the multi-core HFs shown in FIG. 26.

The connectability of the multi-core HF 5a will now be explained in contrast to that of the multi-core HF 5. To begin with, it is assumed herein that two of the multi-core HFs 5 are connected to each other. FIG. 39 is a schematic for explaining connection of the multi-core HFs 5 shown in FIG. 26. As shown in FIG. 39, it is assumed herein that light L is injected into the core 512 in the multi-core HF 5 at the left side of the drawing; a light receiving unit is connected to the end opposing to the end to be connected in the multi-core HF 5 at the right side of the drawing; and these multi-core HFs 5 are connected while monitoring the intensity of the light received at the light receiving unit. In this scenario, if the position of the core 512 in the multi-core HF 5 at the left side of the drawing is aligned to the position of any one of the cores 512 to 517 of the multi-core HF 5 at the right side of the drawing, the light L will be coupled from the core 512 in the left side multi-core HF 5 to that one of the cores 512 to 517 of the right side multi-core HF 5, propagate therethrough to the opposite side, and the intensity of the light received at the light receiving unit becomes increased. At this time, the cores 511, and 513 to 517, other than the core 512, of the multi-core HF 5 at the left side of the drawing is aligned to any ones of the cores 511 to 517 in the multi-core HF 5 at the right side of the drawing. In other words, when two of the multi-core HFs 5 are connected without identifying each one of the cores 512 to 517, an index of the alignment will be only the intensity of the received light.

On the contrary, upon actually deploying a system using multi-core optical fibers or inspecting the multi-core optical fiber itself, there are situations that the cores 512 to 517 need to be identified. According to the above-described method, every time the right side multi-core HF 5 is rotated for 60 degrees, the intensity of the received light becomes increased. Therefore, the cores 512 to 517 cannot be identified. Hence, the intensity of the received light alone cannot be used as the index of alignment of the cores when the cores 512 to 517 need to be identified.

Figure 40:
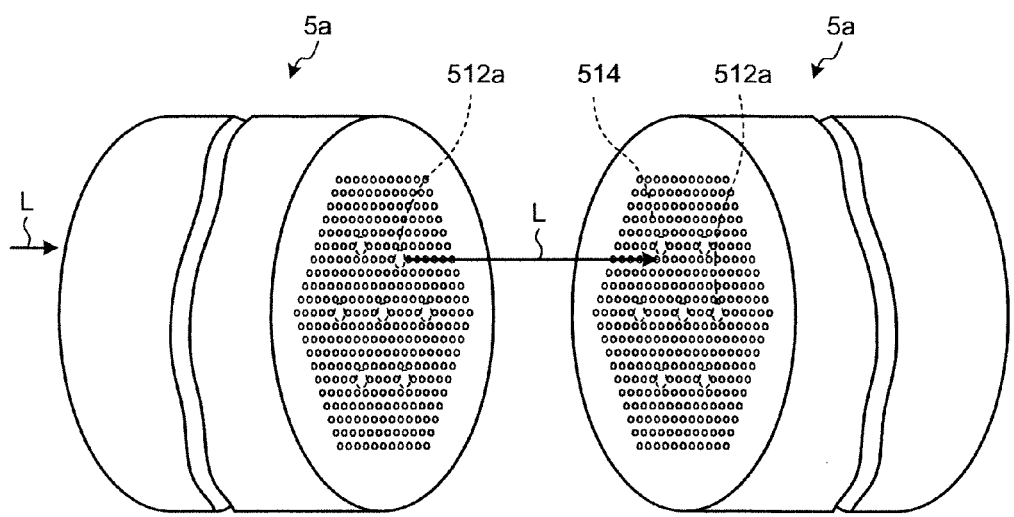
FIG. 40 is a schematic for explaining the connection of the multi-core HFs shown in FIG. 38.

FIG. 40 is a schematic for explaining the connection of the multi-core HFs 5a shown in FIG. 38. As shown in FIG. 40, it is assumed herein that the light L is injected into the core 512a in the multi-core HF 5a at the left side of the drawing; a light receiving unit is connected to the end opposing to the end to be connected in the multi-core HF 5a at the right side of the drawing; and these multi-core HFs 5a are connected while monitoring the intensity of the light received at the light receiving unit. It is also assumed herein that the cores 512a of these multi-core HFs 5a are not aligned to each other. In this situation, because the cores 512a of the multi-core HFs 5a are offset from their standard positions, the light L output from the core 512a of the left side multi-core HF 5a is not coupled to the core 514 of the right side multi-core HF 5a. As a result, the light L hardly propagates to the multi-core HF 5a at the right side, resulting in extremely weak or zero light intensity received at the light receiving unit.

Figure 41:
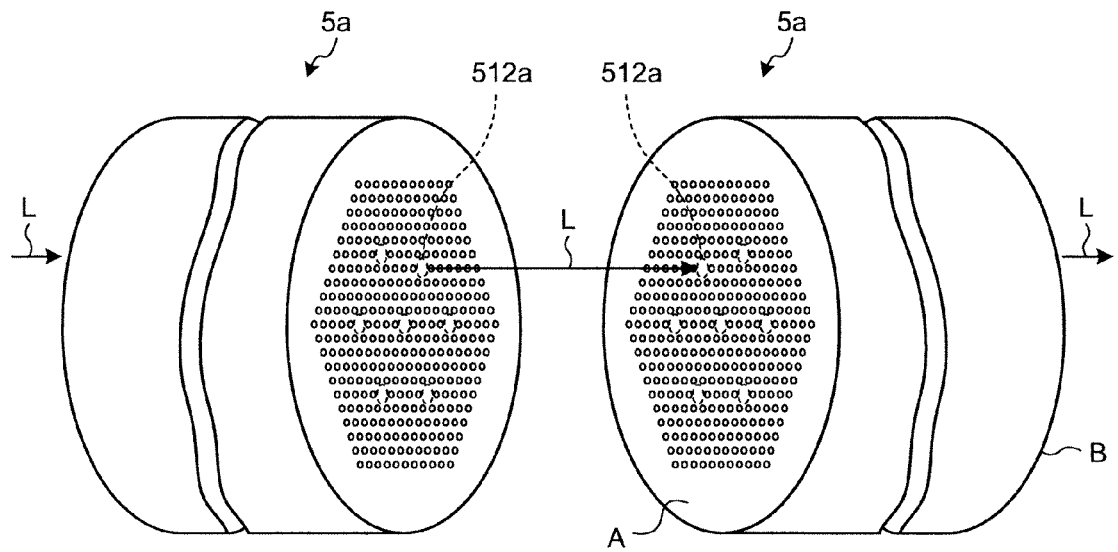
FIG. 41 is a schematic of the right side multi-core HF shown in FIG. 40 rotated for 120 degrees.

Only when the right side multi-core HF 5a is rotated for 120 degrees from the position shown in FIG. 40, as shown in FIG. 41, so that cores 512a of the two multi-core HFs 5a become aligned, the light L is coupled from the core 512a of the multi-core HF 5a at the left side to the core 512a of the multi-core HF 5a at the right side, and propagates to the other end, thus increasing the intensity of the light received at the light receiving unit. The intensity of the received light increases only once, during a 360-degree rotation of the right side multi-core HF 5. Therefore, the intensity of the received light alone can be used as the index for the core alignment. In this manner, the multi-core HF 5a enables a specific core to be easily connected to a specific core of another multi-core HF or an optical apparatus.

The multi-core HF 5a can also be connected easily according to another connection method. For example, two of the multi-core HFs 5a are positioned so that one ends thereof face to each other, and a mirror or a prism is inserted between these one ends of the two multi-core HFs 5a. While observing each of these ends of the two multi-core HFs 5a, made observable by the mirror or the prism, at least one of the two of the multi-core HFs 5a is rotated around the center axis thereof to align the cores. At this time, the cores of the two multi-core HFs 5a can be connected easily by determining the rotated position with reference to the core 512a.

Furthermore, the above connection methods can be combined. While observing the ends with a mirror, for example, the rotated position of the two multi-core HFs 5a may be rotated to adjust the positions thereof roughly with reference to the cores 512a, and then further rotated to adjust the positions thereof more precisely using a light intensity monitor. In this manner, the rough and precise adjustments can be realized quickly and easily.

Figure 42:
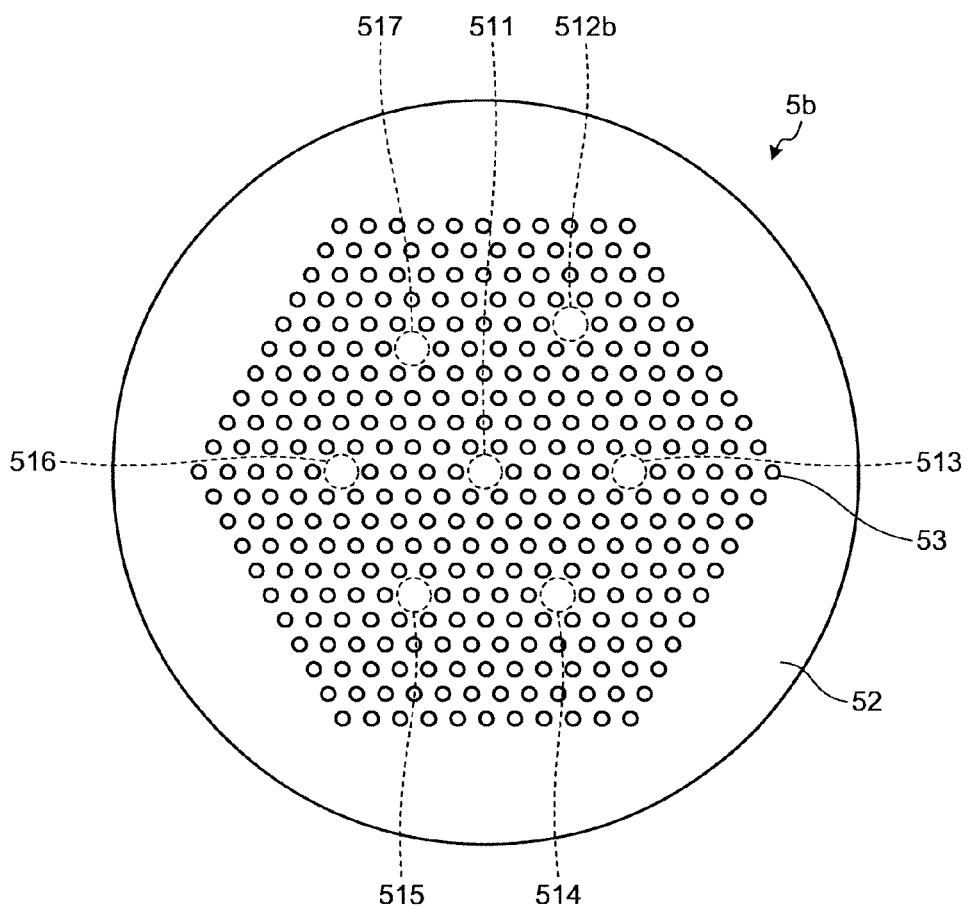
FIG. 42 is a schematic sectional view of a multi-core HF according to a first modification.

FIG. 42 is a schematic sectional view of a multi-core HF 5b according to a first modification of the third embodiment. The multi-core HF 5b is different from the multi-core HF 5 in that a core 512b, corresponding to the core 512 of the multi-core HF 5 shown in FIG. 26, is offset from the position of the core 512 by the lattice constant Λ toward the opposite side of the core 511. The other cores 511, and 513 to 517, the cladding 52, the holes 53 have the same structures as those in the multi-core HF 5. In other words, in the multi-core HF 5b, when the cores that are six-fold rotational symmetric around the center axis of the cladding 52 are considered as in a standard arrangement, only one of the cores, i.e., the core 512b, is arranged at a position offset from the standard arrangement. The multi-core HF 5b enables specific cores to be connected easily, in the same manner as the multi-core HF 5a.

Figure 43:
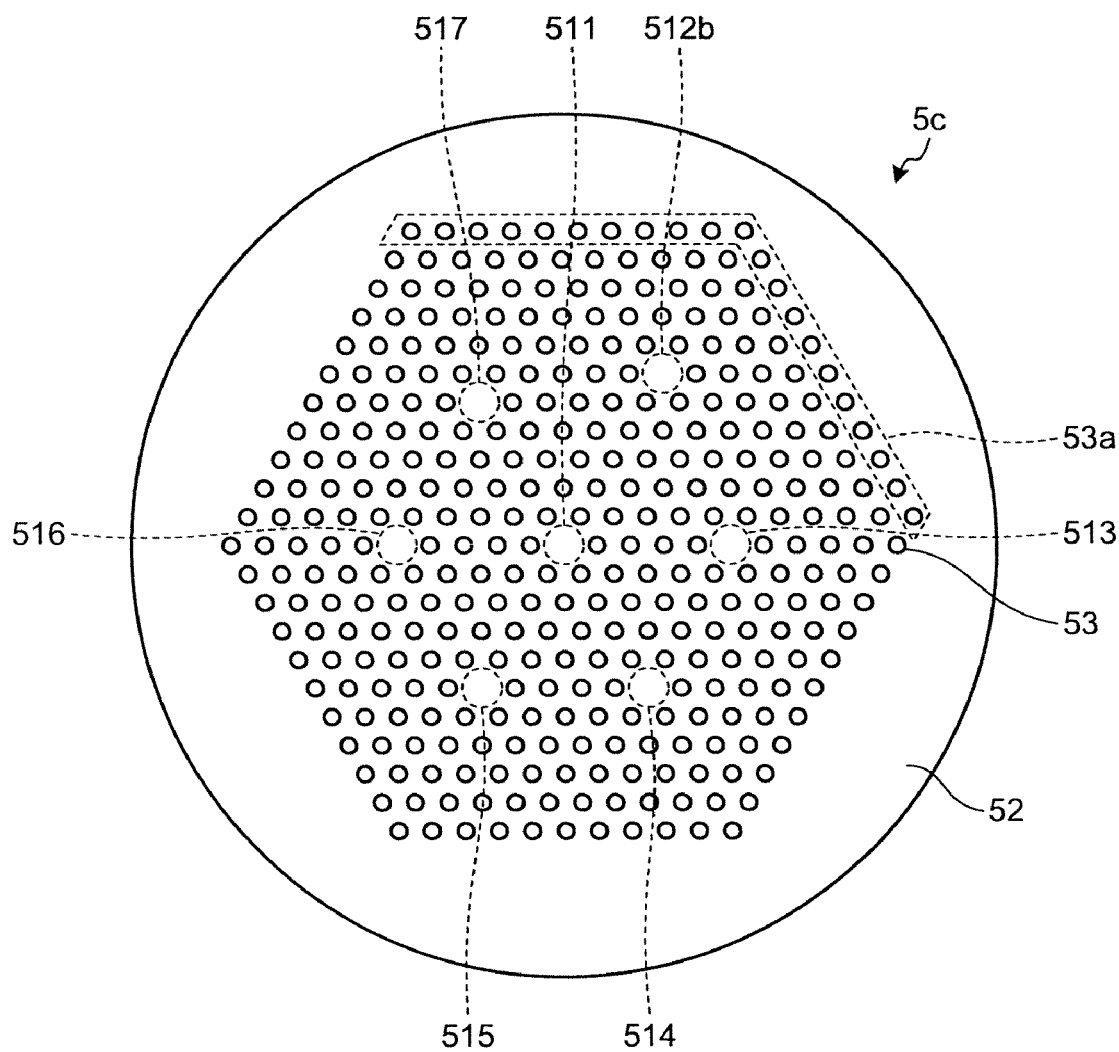
FIG. 43 is a schematic sectional view of a multi-core HF according to a second modification.

FIG. 43 is a schematic sectional view of a multi-core HF 5c according to a second modification of the third embodiment. The multi-core HF 5c is further formed with a plurality of holes 53a outside the core 512b in the multi-core HF 5b shown in FIG. 42. As a result, the multi-core HF 5c has five hole layers around the core 512b, thus enabling the confinement loss to be reduced in the core 512b in comparison with the multi-core HF 5b.

Figure 44:
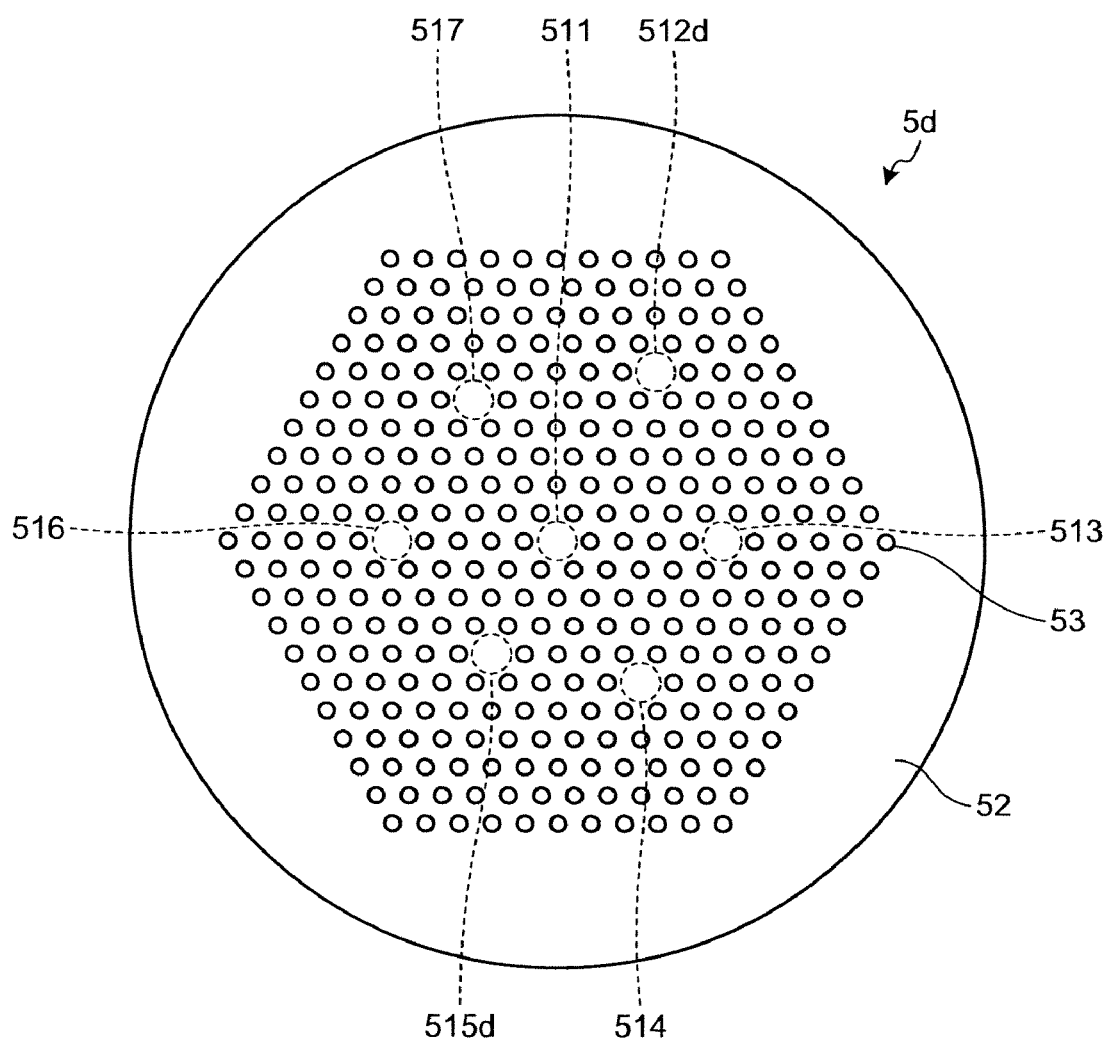
FIG. 44 is a schematic sectional view of a multi-core HF according to a third modification.

FIG. 44 is a schematic sectional view of a multi-core HF 5d according to a third modification of the third embodiment. The multi-core HF 5d is different from the multi-core HF 5 in that cores 512d and 515d, corresponding to the cores 512 and 515 of the multi-core HF 5 shown in FIG. 26, are offset from the position of the cores 512 and 515 by the lattice constant Λ toward the opposite side of the core 511 or toward the core 511. The other cores 511, 513, 514, 516, and 517, the cladding 52, the holes 53 have the same structures as those in the multi-core HF 5. In other words, in the multi-core HF 5d, when the cores that are six-fold rotational symmetric around the center axis of the cladding 52 are considered as in a standard arrangement, the two cores 512d and 515d are arranged at positions offset from the standard arrangement. The multi-core HF 5d also enables specific cores to be connected easily, in the same manner as the multi-core HF 5a.

Figure 45:
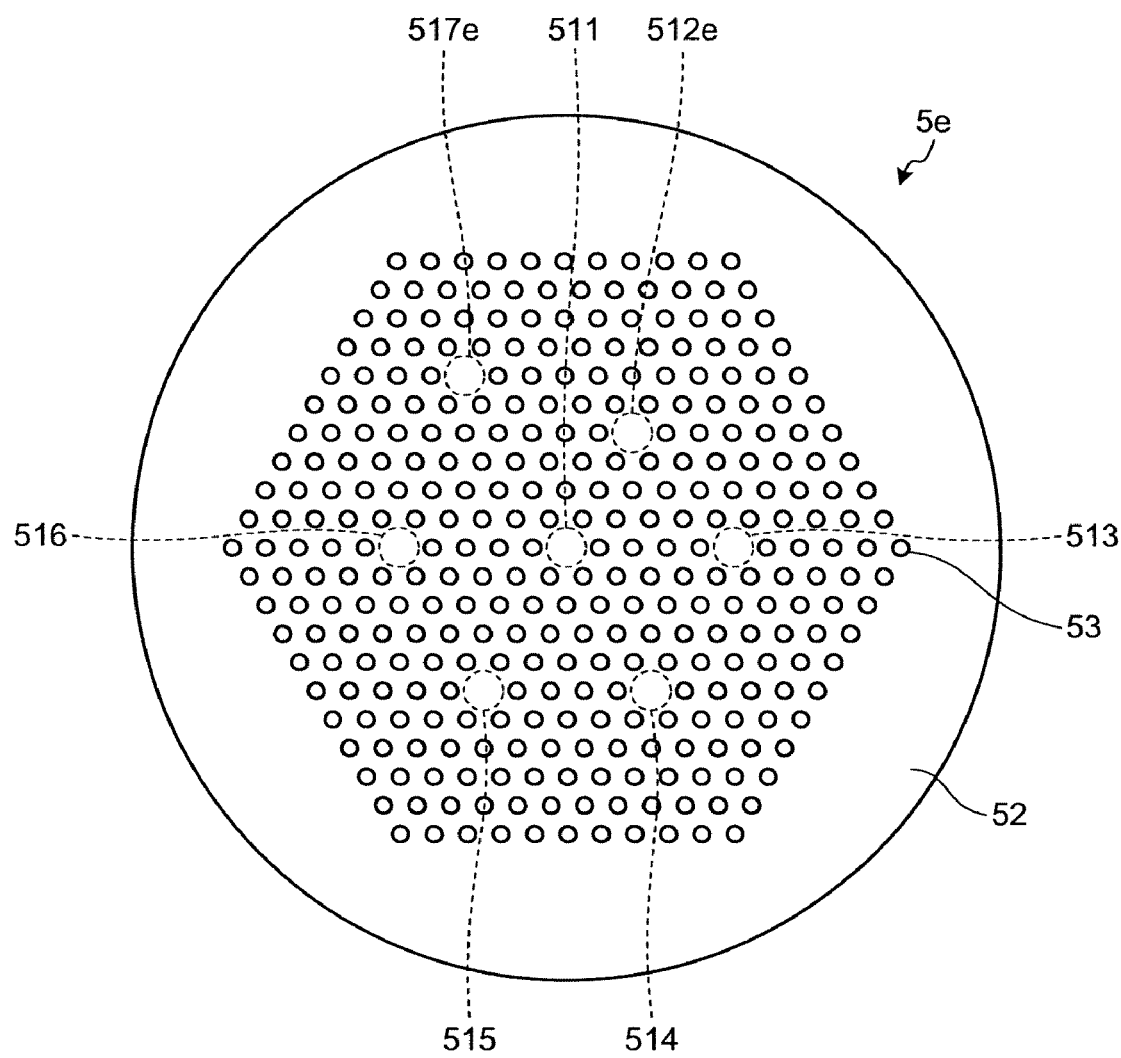
FIG. 45 is a schematic sectional view of a multi-core HF according to a fourth modification.

FIG. 45 is a schematic sectional view of a multi-core HF 5e according to a fourth modification of the third embodiment. The multi-core HF 5e is different from the multi-core HF 5 in that cores 512e and 517e, corresponding to the cores 512 and 517 of the multi-core HF 5 shown in FIG. 26, are offset from the position of the cores 512 and 517 by the lattice constant Λ toward the core 511 or toward the opposite side of the core 511. The other cores 511, and 513 to 516, the cladding 52, the holes 53 have the same structures as those in the multi-core HF 5. In other words, in the multi-core HF 5e, when the cores that are six-fold rotational symmetric around the center axis of the cladding 52 are considered as in a standard arrangement, the two cores 512e and 517e are arranged at positions offset from the standard arrangement, and the cores are arranged so as not to have a line-symmetric axis on the cross section of the multi-core HF 5e. As a result, in the multi-core HF 5e, each end of the multi-core HF 5e (see the ends A and B in FIG. 41) can be identified.

In other words, when the multi-core HF 5e is cut, one of the cross section will be as shown in FIG. 45; and the cross section opposing thereto will be mirror symmetry of the cross section shown in FIG. 45. Because in the multi-core HF 5e, the two cores 512e and 517e are arranged at positions offset from the standard arrangement, and the cores are arranged so as not to have a line-symmetric axis, a specific core can be identified even on the mirror-symmetrical cross section. Therefore, the multi-core HF 5e enables the positions of the cores 512e and 517e to be identified more reliably, as well as those of the other cores, thus enabling the cores to be connected more easily.

Figure 46:
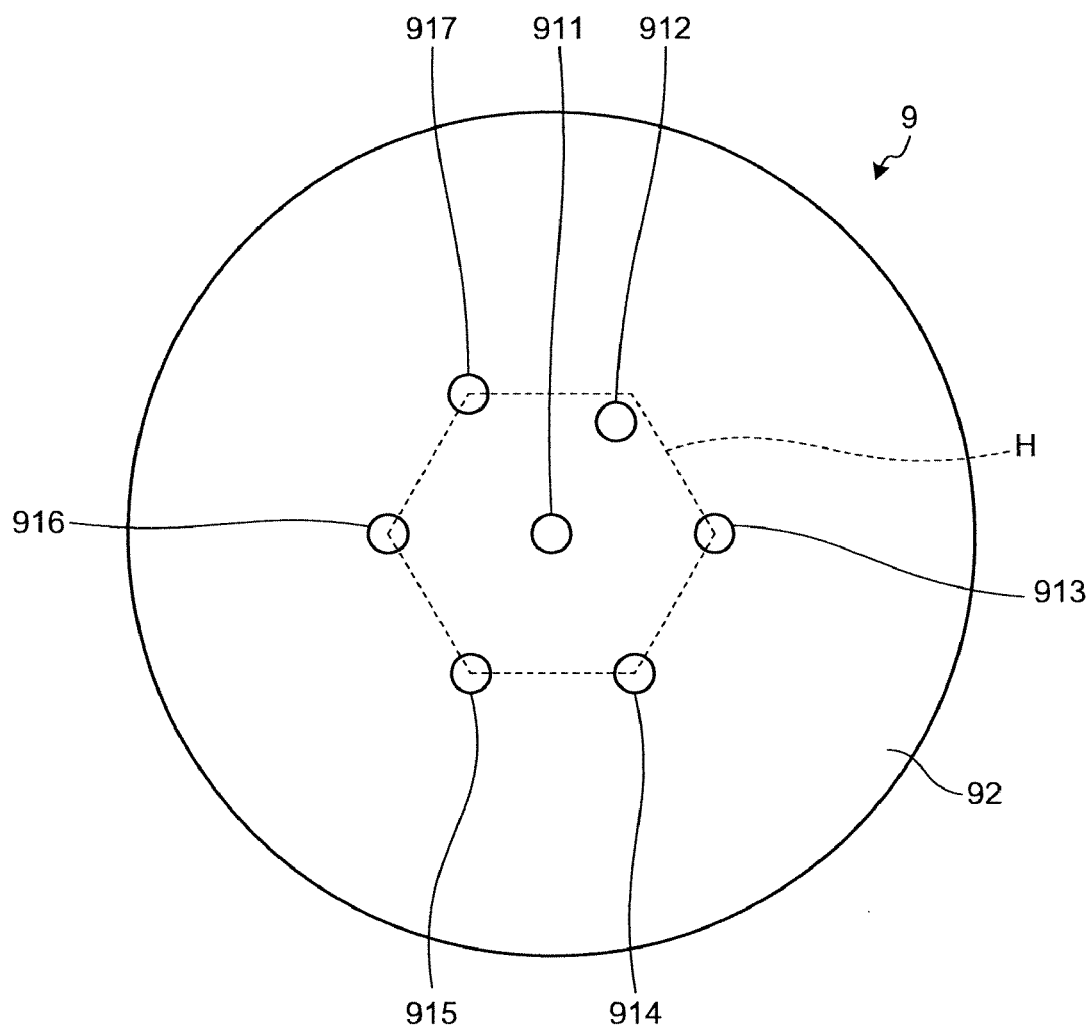
FIG. 46 is a schematic sectional view of a multi-core optical fiber according to a fourth embodiment of the present invention.

FIG. 46 is a schematic sectional view of a multi-core optical fiber 9 according to a fourth embodiment of the present invention. As shown in FIG. 46, the multi-core optical fiber 9 is a solid multi-core optical fiber having no hole. The multi-core optical fiber 9 includes cores 911 to 917 arranged separately from each other, and a cladding 92 arranged around the external circumference of the cores 911 to 917. The core 911 is arranged at the approximate center of the cladding 92. When the cores that are arranged in a regular hexagon, shown as H, around the center axis of cladding 92 are considered as in a standard arrangement, the cores 913 to 917 are disposed at their standard positions, and one of the cores, i.e., the core 912, is arranged at a position offset from the standard arrangement. There is no special limitation as to how far the cores 911 to 917 are separated from each other, or in a diameter of the cores of the cores 911 to 917; the distance is approximately 60 micrometers, for example, and the core diameter is approximately 5.0 micrometers to 10.0 micrometers. Each of the cores 911 to 917 is made of silica based glass added germanium, and the cladding is made of pure silica glass. As a result, the cladding 92 has low refractive index in comparison to that of each of the cores 911 to 917, and relative refractive index difference of the cores 911 to 917 with respect to the cladding 92 is approximately 0.3 percent to 1.5 percent. The multi-core optical fiber 9 confines the light in the each of the cores 911 to 917 by way of the refractive index difference, and propagates the light therethrough.

Also in the multi-core optical fiber 9, one of the cores, i.e., the core 912, is arranged at a position offset from the standard arrangement. Therefore, connection can be easily made in the same manner as the multi-core HF 5a.

In this manner, the multi-core optical fiber according to the present invention may also be a solid multi-core optical fiber.

Figure 47:
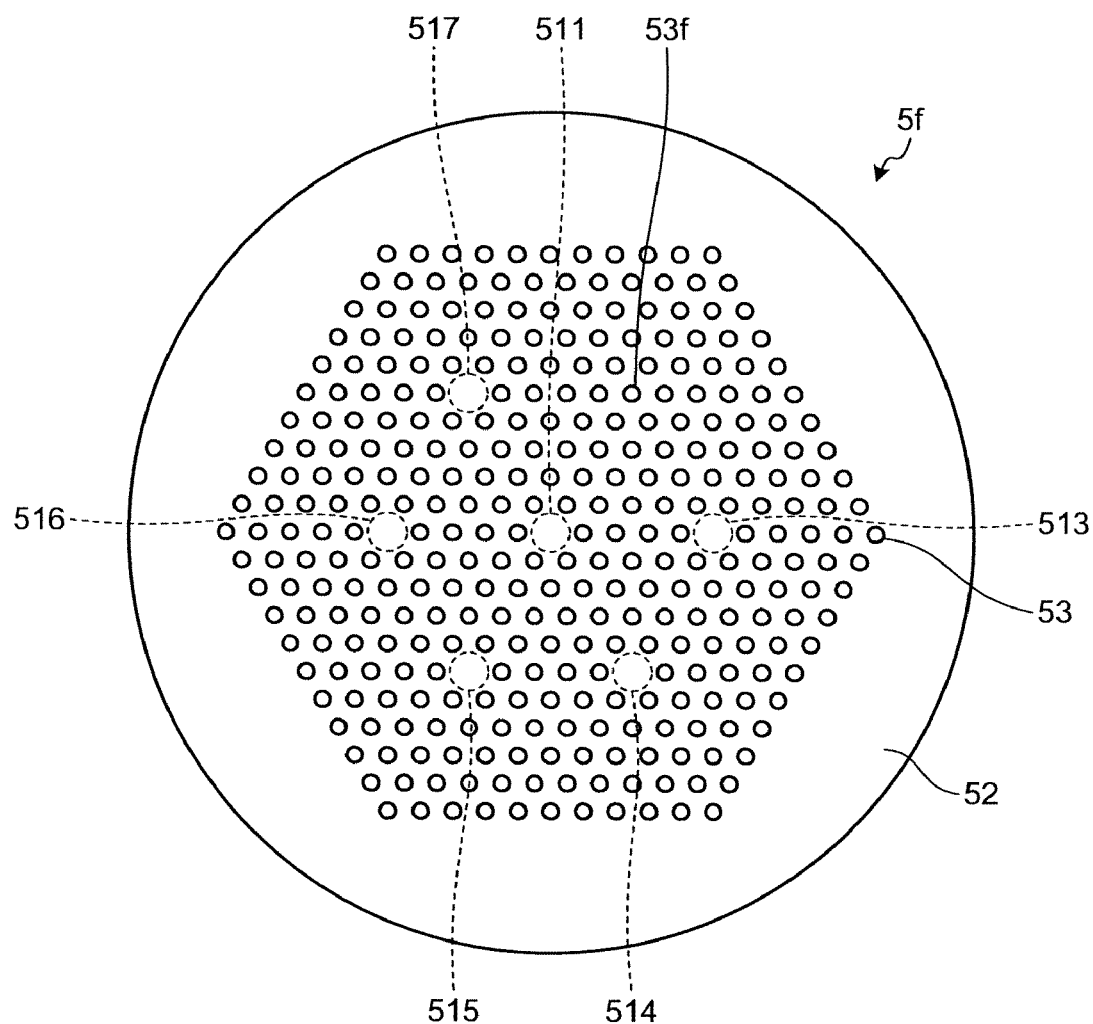
FIG. 47 is a schematic sectional view of a multi-core HF according to a fifth embodiment of the present invention.

FIG. 47 is a schematic sectional view of a multi-core HF 5f according to a fifth embodiment of the present invention. The multi-core HF 5f is different from the multi-core HF 5 in that the multi-core HF 5f has no core corresponding to the core 512 in the multi-core HF 5 shown in FIG. 26, and an hole 53f is formed at the position corresponding to the core 512. The other cores 511, and 513 to 517, the cladding 52, the holes 53 have the same structures as those in the multi-core HF 5. In other words, in the multi-core HF 5f, when the cores that are six-fold rotational symmetric around the center axis of the cladding 52 are considered as in a standard arrangement, the cores 513 to 517 are arranged in the standard arrangement except for one position.

The multi-core HF 5f can be also connected easily in the same manner as the multi-core HF 5a. It is assumed herein that light is injected into the cores 513 to 517 in one of the two multi-core HFs 5f, upon connecting the other multi-core HF thereto according to the methods shown in FIGS. 39 to 41, for example. In this scenario, only when the cores 513 to 517 of the two multi-core HFs 5f are aligned to each other, the light is coupled from the cores 513 to 517 of the one multi-core HF 5f to the corresponding cores 513 to 517 of the other multi-core HF 5f, and propagates to the opposite end, thus increasing the intensity of the light received at the light receiving unit to the maximum. The intensity of the received light reaches to the maximum only once when the other multi-core HF 5f is rotated for 360 degrees. Therefore, also in the multi-core HF 5f, the intensity of the received light alone can be used as an index for aligning the cores, facilitating easy connection thereof.

In this manner, the present invention may include a multi-core optical fiber having cores arranged at the standard arrangement except for one position.

As a modification of the multi-core HF 5f according to the fifth embodiment, the cores may be arranged in the standard arrangement except for two positions, or arranged so as not to have a line-symmetric axis.

Furthermore, according the present invention, the cores may be arranged in the standard arrangement except for one position, or arranged so as not to have a line-symmetric axis, also in a solid multi-core optical fiber such as one according to the fourth embodiment.

The third to fifth embodiments and the modifications thereof are described as examples only; therefore, the cores, the holes for confining light in the cores, the number thereof, and the arrangement thereof are not limited to those described above. For example, a core arrangement of two- to twelve-fold rotational symmetries may be also used as a standard arrangement. Furthermore, it is possible to select, as appropriate, which core should be offset from its standard position, or which standard position should be the one without allocation of the core.

As described above, according to one aspect of the present invention, it is possible to provide an optical transmission system that enables single-mode and large capacity transmission of optical signals in a broad bandwidth with low bending loss, and to provide a multi-core optical fiber that can be used in such an optical transmission system, advantageously.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical transmission system comprising:
an optical transmitting unit that outputs at least one optical signal having a wavelength included in an operation wavelength band; and
a holey fiber that is connected to the optical transmitting unit, the holey fiber including
a core through which the optical signal is transmitted,
a cladding formed around the core, the cladding including a plurality of holes formed around the core in a triangular lattice shape, wherein
the holey fiber transmits the optical signal in a single mode, and
a bending loss of the holey fiber is equal to or less than 5 dB/m at a wavelength in the operation wavelength band when the holey fiber is wound at a diameter of 20 millimeters,
the core of the holey fiber is surrounded by not less than four layers of the holes,
a confinement loss of the holey fiber is equal to or less than 0.001 dB/km at the wavelength in the operation wavelength band, and
design parameters of the holey fiber satisfy $0.4 \leq d/\Lambda \leq 0.43$, $\Lambda \leq -0.518\lambda_s^2 + 6.3617\lambda_s + 1.7468$, and $\lambda \geq -0.0801\lambda_l^2 + 3.6195\lambda_l + 0.3288$ where $\Lambda$ is lattice constant of the triangular lattice in micrometers, d is diameter of each of the holes in micrometers, $\lambda_l$ is a maximum wavelength in the operation wavelength band in micrometers, and $\lambda_s$ is minimum wavelength in the operation wavelength band in micrometers.

2. The optical transmission system according to claim 1, wherein
a bending loss of the holey fiber is equal to or less than 1 dB/m at a wavelength in the operation wavelength band when the holey fiber is wound at a diameter of 20 millimeters, and
the design parameters of the holey fiber satisfy $\Lambda \leq -0.739\lambda_s^2 + 6.3115\lambda_s + 1.5687.$ 3. The optical transmission system according to claim 1, wherein
the core is surrounded by five layers of the holes.

4. The optical transmission system according to claim 1, wherein
the core is surrounded by six layers of the holes.

5. The optical transmission system according to claim 1, wherein
the operation wavelength band is selected from 0.55 micrometers to 1.7 micrometers,
design parameters of the holey fiber includes $\Lambda$ is not less than 5 micrometers.

6. The optical transmission system according to claim 1, wherein
the operation wavelength band is selected from 1.0 micrometers to 1.7 micrometers,
design parameters of the holey fiber includes $\Lambda$ is not less than 7 micrometers.

7. An optical transmission system comprising:
an optical transmitting unit that outputs at least one optical signal having a wavelength included in an operation wavelength band;
a holey fiber that is connected to the optical transmitting unit, the holey fiber including
a plurality of cores separated from each other through each of which the optical signal is transmitted, and
a cladding formed around the cores, the cladding including a plurality of holes arranged around each of the cores in a triangular lattice shape;
an optical multiplexing unit that multiplexes optical signals output form the optical transmitting unit;
an optical demultiplexing unit that demultiplexes the optical signals transmitted through the holey fiber; and
an optical receiving unit that receives the optical signals demultiplexed by the optical demultiplexing unit, wherein
the holey fiber transmits the optical signal in a single mode through each of the cores,
a bending loss of the holey fiber is equal to or less than 5 dB/m at a wavelength in the operation wavelength band when the holey fiber is wound at a diameter of 20 millimeters,
each of the cores of the holey fiber are surrounded by not less than four layers of the holes,
a confinement loss of the holey fiber is equal to or less than 0.001 dB/km at the wavelength in the operation wavelength band, and
design parameters of the holey fiber satisfy $0.4 \leq d/\Lambda \leq 0.43,$ $\Lambda \leq -0.518\lambda_s^2 + 6.3617\lambda_s + 1.7468,$ and $\Lambda \geq -0.0801\lambda_l^2 + 3.6195\lambda_l + 0.3288$ where $\Lambda$ is lattice constant of the triangular lattice in micrometers, d is diameter of each of the holes in micrometers, $\lambda_l$ is a maximum wavelength in the operation wavelength band in micrometers, and $\lambda_s$ is minimum wavelength in the operation wavelength band in micrometers.

8. The optical transmission system according to claim 7, wherein the holey fiber has the cores arranged so that four or more of the holes are disposed between any two of these cores.

9. The optical transmission system according to claim 7, further comprising an applying unit that intentionally applies any one of a bend or a lateral pressure or both to suppress interferences between the cores.

10. The optical transmission system according to claim 7, wherein
a bending loss of the holey fiber is equal to or less than 1 dB/m at a wavelength in the operation wavelength band when the holey fiber is wound at a diameter of 20 millimeters, and
the design parameters of the holey fiber satisfy $\Lambda \leq -0.739\lambda_s^2 + 6.3115\lambda_s + 1.5687.$ 11. The optical transmission system according to claim 7, wherein
each of the cores is surrounded by five layers of the holes.

12. The optical transmission system according to claim 7, wherein
each of the cores is surrounded by six layers of the holes.

13. The optical transmission system according to claim 7, wherein
the operation wavelength band is selected from 0.55 micrometers to 1.7 micrometers,
design parameters of the holey fiber includes $\Lambda$ is not less than 5 micrometers.

14. The optical transmission system according to claim 7, wherein
the operation wavelength band is selected from 1.0 micrometers to 1.7 micrometers,
design parameters of the holey fiber includes $\Lambda$ is not less than 7 micrometers.

15. An optical transmission system comprising:
an optical transmitting unit that outputs at least one optical signal having a wavelength included in an operation wavelength band;
a holey fiber that is connected to the optical transmitting unit, the holey fiber including
a plurality of cores separated from each other through each of which the optical signal is transmitted, and
a cladding formed around the cores, the cladding including a plurality of holes arranged around each of the cores in a triangular lattice shape;
an applying unit that intentionally applies any one of a bend or a lateral pressure or both to suppress interferences between the cores of the holey fiber;
an optical multiplexing unit that multiplexes optical signals output form the optical transmitting unit;
an optical demultiplexing unit that demultiplexes the optical signals transmitted through the holey fiber; and
an optical receiving unit that receives the optical signals demultiplexed by the optical demultiplexing unit, wherein
the holey fiber transmits the optical signal in a single mode through each of the cores, and
a bending loss of the holey fiber is equal to or less than 5 dB/m at a wavelength in the operation wavelength band when the holey fiber is wound at a diameter of 20 millimeters.

* * * * *